(12) United States Patent
Columbia

(10) Patent No.: US 8,376,387 B2
(45) Date of Patent: Feb. 19, 2013

(54) MULTI-FUNCTION ANTI-ROTATIONAL/ANTI-THEFT HITCH BALL ASSEMBLY

(76) Inventor: John R. Columbia, Brownsville, PA (US)

(*) Notice: Subject to any disclaimer, the term of this patent is extended or adjusted under 35 U.S.C. 154(b) by 0 days.

(21) Appl. No.: 12/211,924

(22) Filed: Sep. 17, 2008

(65) Prior Publication Data

US 2009/0079164 A1 Mar. 26, 2009

Related U.S. Application Data

(63) Continuation-in-part of application No. 12/132,786, filed on Jun. 4, 2008.

(60) Provisional application No. 60/994,062, filed on Sep. 17, 2007.

(51) Int. Cl.
*B60D 1/06* (2006.01)

(52) U.S. Cl. ........................................ 280/511; 280/507

(58) Field of Classification Search .................. 280/511, 280/507, 506, 491.5; 70/237, 258, 14, 57; D12/162
See application file for complete search history.

(56) References Cited

U.S. PATENT DOCUMENTS

| | | | | |
|---|---|---|---|---|
| 2,616,717 A * | 11/1952 | Dunlap | ........................ | 280/507 |
| 3,393,924 A * | 7/1968 | Silver | ........................ | 280/461.1 |
| 3,790,192 A * | 2/1974 | Green | ........................ | 280/507 |
| 3,876,242 A * | 4/1975 | Eaton | ........................ | 280/511 |
| D273,778 S * | 5/1984 | Ruhland | ........................ | D12/162 |
| 4,509,770 A * | 4/1985 | Young et al. | ........................ | 280/507 |
| 4,576,021 A * | 3/1986 | Holden | ........................ | 70/34 |
| 4,577,884 A * | 3/1986 | Harris | ........................ | 280/507 |
| 5,143,393 A * | 9/1992 | Meyer | ........................ | 280/491.1 |
| 5,540,065 A * | 7/1996 | Wyers | ........................ | 70/26 |
| D376,339 S * | 12/1996 | Arakelian | ........................ | D12/162 |
| 6,155,590 A * | 12/2000 | Herrera et al. | ........................ | 280/511 |
| 6,234,510 B1* | 5/2001 | Hammons | ........................ | 280/477 |
| 6,343,808 B1* | 2/2002 | Luh | ........................ | 280/511 |
| 7,195,269 B2* | 3/2007 | Tambornino | ........................ | 280/491.1 |
| 7,204,505 B2* | 4/2007 | Moss | ........................ | 280/491.1 |
| 7,229,130 B1* | 6/2007 | Holly et al. | ........................ | 297/217.1 |
| 7,273,223 B2* | 9/2007 | Irgens et al. | ........................ | 280/511 |
| 7,419,177 B2* | 9/2008 | Kottke et al. | ........................ | 280/511 |
| 2003/0085548 A1* | 5/2003 | Morgan | ........................ | 280/507 |
| 2004/0007852 A1* | 1/2004 | Tambornino | ........................ | 280/491.2 |
| 2004/0195804 A1* | 10/2004 | Milazzo | ........................ | 280/511 |
| 2005/0040623 A1* | 2/2005 | Krespach et al. | ........................ | 280/511 |
| 2006/0017261 A1* | 1/2006 | Rickey | ........................ | 280/507 |
| 2006/0119075 A1* | 6/2006 | Chen | ........................ | 280/511 |
| 2006/0214391 A1* | 9/2006 | Columbia | ........................ | 280/491.5 |
| 2006/0279067 A1* | 12/2006 | Irgens et al. | ........................ | 280/511 |
| 2008/0272574 A1* | 11/2008 | Stuart | ........................ | 280/511 |
| 2009/0200771 A1* | 8/2009 | Prine | ........................ | 280/507 |

FOREIGN PATENT DOCUMENTS

GB 2195967 * 4/1988

* cited by examiner

*Primary Examiner* — Anne Marie M Boehler
(74) *Attorney, Agent, or Firm* — The Webb Law Firm

(57) ABSTRACT

The Multi-Function Anti-Rotational/Anti-Theft Hitch Ball Assembly of the present invention provides a trailer hitch assembly that includes an anti-rotational hitch ball mechanism that can also serve as an anti-theft hitch ball mechanism and can further simultaneously function as an attachment method for securing additional hitch accessories to the ball mount. The invention provides an engagement method for interlocking the hitch ball with the ball mount preventing rotation of the hitch ball relative to the ball mount. The interlocking engagement assembly may also be locked in place preventing the hitch ball from being removed from the ball mount if the hitch ball fastener is removed. In addition, a component of the assembly can serve as an attachment method for securing additional accessories to the ball mount.

6 Claims, 18 Drawing Sheets

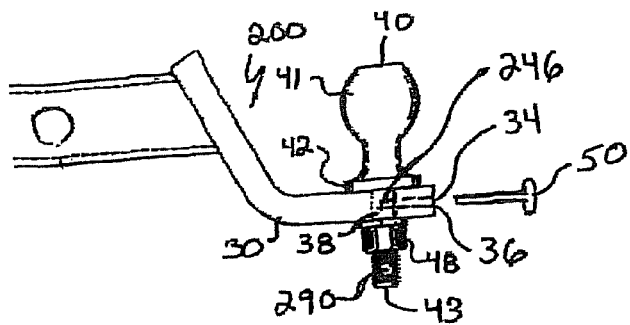
FIG. 9
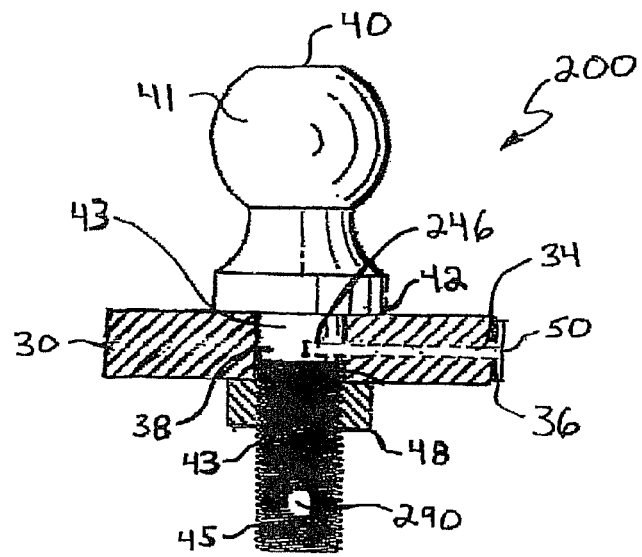
FIG. 10A
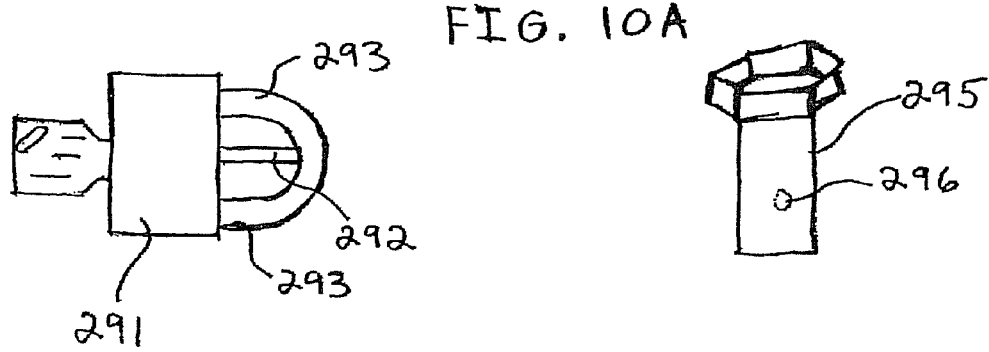

MULTI-FUNCTION ANTI-ROTATIONAL/ANTI-THEFT HITCH BALL ASSEMBLY

CROSS REFERENCE TO RELATED APPLICATION

This application is a continuation-in-part of U.S. application Ser. No. 12/132,786, filed Jun. 4, 2008, and claims priority to U.S. Provisional Application No. 60/994,062, filed Sep. 17, 2007, which applications are both herein incorporated by reference in their entirety.

BACKGROUND OF THE INVENTION

1. Field of the Invention

The present invention relates generally to trailer hitch accessories, and more particularly to a trailer hitch assembly that includes an anti-rotational hitch ball mechanism that can also serve as an anti-theft hitch ball mechanism and can further simultaneously function as an attachment method for securing additional hitch accessories to the ball mount. The assembly generally includes a ball mount, hitch ball, locking washer, fastener, locking pin and lock. The invention provides an engagement method for interlocking the hitch ball with the ball mount preventing rotation of the hitch ball relative to the ball mount. The interlocking engagement assembly may also be locked in place preventing the hitch ball from being removed from the ball mount if the hitch ball fastener is removed. In addition, the assembly's locking pin may be a stand-alone pin or may be a feature or component of another hitch accessory that can secure the additional accessory to the ball mount.

2. Description of the Related Art

In recent years, the number, variety and type of interlocking hitch ball assemblies and anti-theft hitch ball locks have increased significantly. Interlocking hitch ball assemblies prevent the trailer ball from rotating when fastening or unfastening the trailer ball to the ball mount or drawbar, thus simplifying installation and removal, while anti-theft hitch ball locks prevent unintended or unauthorized removal of the trailer ball from the ball mount or drawbar. While some of the existing assemblies are effective products, in the current art, realizing the benefits of both functions necessitates the purchase and use of two separate products, resulting in increased costs to both the manufacturer and consumer.

In addition, some hitch ball locks, like the one disclosed in U.S. Pat. No. 6,846,002 B2, function as a locking hitch ball only when the hitch ball is engaged and locked by a trailer coupler. The product of the referenced patent offers no anti-theft hitch ball protection when a trailer tongue is not connected and locked to the hitch ball.

In the current art, some interlocking hitch ball assemblies, like an embodiment described in US Patent Application Publication Number US 2006/0279067 A1, and the Interlock™ System manufactured by Cequent Towing Products, utilize a non-cylindrical customized-shaped hitch ball flange to interlock with a corresponding mating surface or locking pin on the ball mount, resulting in increased manufacturing costs to produce the customized hitch ball and/or customized ball mount with interlocking mating surface, as well as increased marketing costs to promote multiple products.

A popular anti-rotational hitch ball currently available in the market utilizes a locking pin that is press-fit into the ball mount platform and protrudes from both the upper and lower ball mount surfaces to permit engaging a customized corresponding trailer ball in either the drop or rise position. While this method serves its intended purpose, the press-fit pin interferes with and prevents several other useful hitch accessories from being installed on the ball mount such as the hitching apparatus described in U.S. Pat. No. 5,697,630 and the safety hold down device and hitch guide described and illustrated in FIGS. 5 and 6 in U.S. Pat. No. 6,969,085 B2. Additionally, with the inclusion of receiver-type hitches on ATVs, golf carts, lawn and garden tractors, etc., often times a ball mount is used without a trailer ball attached for coupling accessories equipped with a bifurcated trailer tongue rather than socket-type tongue. With this type of connection, bifurcated ends on the trailer tongue straddle the ball mount platform or draw bar and a clevis pin is inserted through apertures in the trailer tongue ends and ball mount platform to secure the accessory to the tow vehicle. Often times, a portion of the bifurcated trailer tongue ends extend forward of the apertures for pinning and, thus, is restricted from operating properly by the press-fit locking pin protruding from the ball mount surfaces.

A much more practical and desirable assembly that solves at least some of the aforementioned problems, and offers economic advantages and benefits is a non-interfering multi-functional assembly that functions as both an anti-rotational hitch ball and anti-theft hitch ball in one innovative assembly.

SUMMARY OF THE INVENTION

An anti-rotational and anti-theft hitch ball assembly of the present invention provides an inexpensive, highly-effective and convenient method of interlocking the trailer ball and ball mount to prevent ball rotation as well as a method of securing the trailer ball to the ball mount. The invention also facilitates the fastening of other hitch accessories to the ball mount and does not interfere with proper towing operation.

The present invention provides a trailer hitch ball with a shank, such as the industry standard shank sizes of ¾", 1", 1¼" and 1⅜", although the invention applies to other sizes as well. The trailer ball shank contains a horizontal small-diameter throughbore or slot to align approximately with the center of the ball mount platform when the trailer ball is securely fastened to the ball mount platform. The invention also includes a ball mount with a ball mount platform containing an industry standard vertical throughbore slightly larger than ¾ or 1" for mounting the trailer ball to the ball mount platform by inserting the trailer ball's threaded shank through the vertical throughbore in the ball mount platform and securing the trailer ball to the ball mount with a locking washer and cooperating fastener. The ball mount platform of the present invention has an additional small diameter throughbore extending horizontally, at a minimum, from the rearward face of the ball mount platform through the center of the body of the ball mount platform and into the ¾ or 1" vertical throughbore used for mounting the trailer ball shank, or preferably through the ¾ or 1" vertical throughbore and continuing in a forward direction into the center of the opposing side of the ball mount platform. The small diameter horizontal throughbore may also extend from the rearward face of the ball mount platform completely through the center of the ball mount platform, passing through the ¾" or 1" vertical throughbore and projecting through the forward face of the ball mount platform underneath the ball mount shank. When the trailer ball is placed in the vertical throughbore in the ball mount platform, a locking pin is inserted into the throughbore on the rearward face of the ball mount platform and pushed forward until the locking pin goes into or preferably through the corresponding throughbore in the shank of the trailer ball, locking the trailer ball in position and preventing it from rotating relative to the ball mount platform.

With the use of a lock that locks a locking pin to the ball mount, the anti-rotational hitch ball assembly concurrently functions as an anti-theft hitch ball assembly. In addition, in lieu of a stand-alone locking pin, the locking pin may be an integral component of another hitch accessory and used to attach the additional accessory when the shank or pin of the additional accessory is inserted into the horizontal through-bore. When tightening the trailer ball fastener, the trailer ball shank will apply torque to the locking pin or shank resulting in an effective attachment method for the additional hitch accessory such as indicia plates or mounts, reflectors, tail lights, brake lights, or any other hitch accessory.

It is an aspect of the invention to provide improved elements and arrangements thereof for the purposes described which is inexpensive, dependable, and fully effective in accomplishing its intended purposes.

These and other aspects of the present invention will become readily apparent upon further review of the following specification and drawings.

BRIEF DESCRIPTION OF THE DRAWINGS

The hitch ball assembly of the present invention may be more easily understood by referring to the drawings included herein. While certain features and embodiments are illustrated, the scope of this application should not be considered as restricted to the illustrations.

FIG. 9 is a side elevation view of another alternative embodiment of the Multi-Function Anti-Rotational/Anti-Theft Hitch Ball Assembly utilizing a shorter locking pin;

Similar reference characters denote corresponding features consistently throughout the attached drawings.

DETAILED DESCRIPTION OF THE PREFERRED EMBODIMENTS

Figure 1:
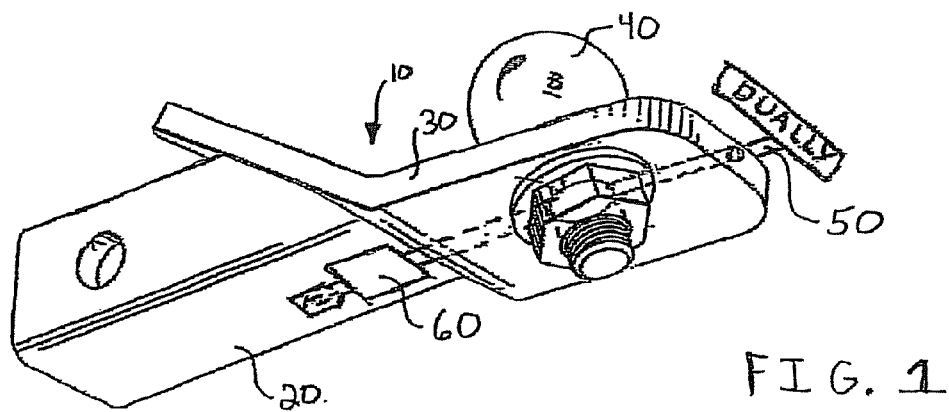
FIG. 1 is a bottom rear side perspective view of a first embodiment of a Multi-Function Anti-Rotational/Anti-Theft Hitch Ball Assembly of the present invention.

As used herein, spatial or directional terms, such as "top," "bottom," "left," "right," "over," "under," "front," "rear," and the like, relate to the invention as it is shown in the drawing figures. However, it is to be understood that the invention can assume various alternative orientations, and, accordingly, such terms are not to be considered as limiting. Further, all numbers expressing dimensions, physical characteristics, and so forth, used in the specification, figures, and claims are to be understood as being modified in all instances by the term "about." Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. The dimensions set forth on the accompanying drawing figures are for one exemplary embodiment of the invention and it is to be understood that the invention is not limited to the specifically disclosed dimensions.

The ball mounts, hitch balls, locking pins, locks and other components illustrated in the drawings are intended to be illustrative and not exhaustive.

Referring to FIG. 1, there is shown a bottom rear side perspective view of a first embodiment of the inventive Multi-Function Anti-Rotational/Anti-Theft Hitch Ball Assembly referred to by the reference number 10. The assembly performs the function of a standard ball mount and hitch ball and includes an anti-rotational mechanism for interlocking the hitch ball with the ball mount as well as an anti-theft mechanism for preventing unauthorized removal of the hitch ball. The assembly includes a ball mount shank 20, ball mount platform 30, hitch ball 40, locking pin 50 and lock 60. Locking pin 50 may be a stand-alone pin, or an integral feature of an additional accessory such as the shank of an indicia plate, as shown, or shank of other accessories such as reflectors, tail lights, brake lights, or other hitch accessories. When hitch ball 40 is installed on ball mount platform 30 and locking pin 50 inserted into position, lock 60 engages locking pin 50 resulting in anti-rotational and anti-theft hitch ball assembly 10.

Figure 2:
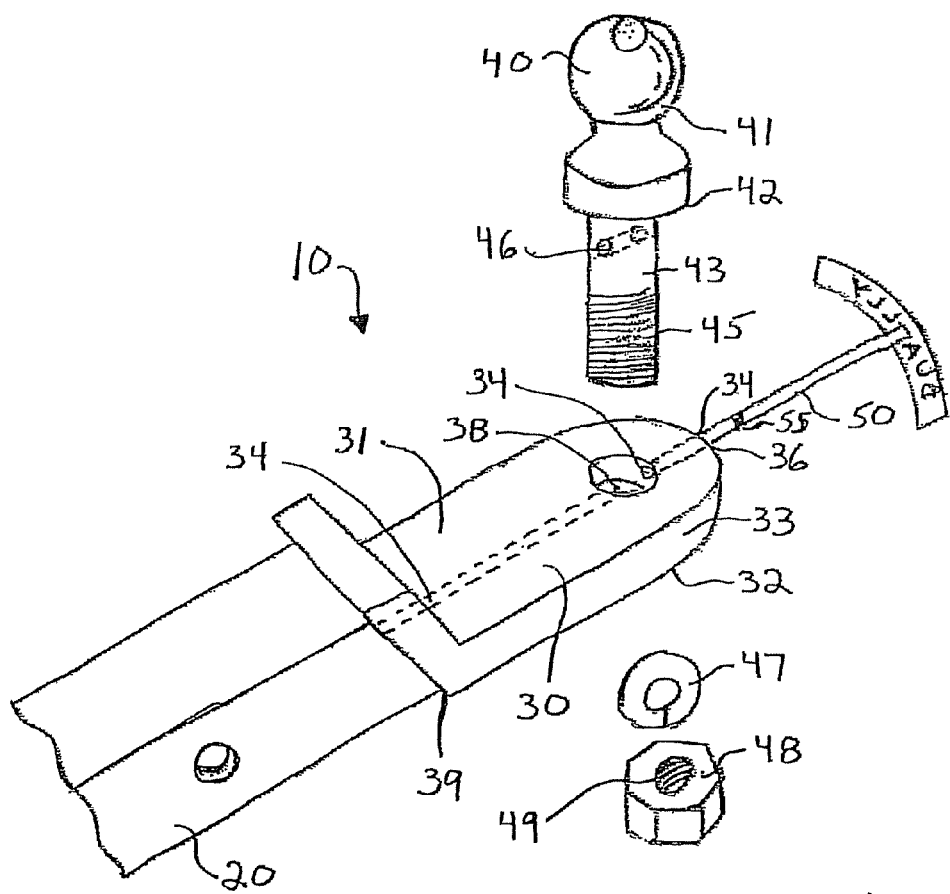
FIG. 2 is an exploded perspective view of the first embodiment of the Multi-Function Anti-Rotational/Anti-Theft Hitch Ball Assembly of FIG. 1.

As shown in FIG. 2, ball mount platform 30 has a top side 31, bottom side 32, and body section 33. Ball mount platform 30 also has a small diameter throughbore 34 in the center of the body section 33 of the ball mount platform 30 extending horizontally from the center rear face of the ball mount platform 36, passing through the center of vertical throughbore 38, and projecting through the center forward face of the ball mount platform 39 underneath ball mount shank 20. Hitch ball 40 includes a ball portion 41, flange portion 42, and shank 43. Shank 43 has an external thread convolution 45 and throughbore 46. Throughbore 46 is slightly larger in diameter than the diameter of locking pin 50 and is positioned on shank 43 to align with throughbore 34 of ball mount platform 30 when hitch ball shank 43 in inserted through ball mount throughbore 38 and hitch ball flange 42 is seated on topside 31 of ball mount platform 30. When shank 43 of hitch ball 40 is placed through vertical throughbore 38 on ball mount platform 30, locking pin 50 is inserted into throughbore 34 and pushed forward through ball mount 30 and hitch ball throughbore 46 continuing through ball mount until exposing the end of locking pin 50 with recess 55 forward of the forward face of ball mount platform 39 underneath ball mount shank 20. When locking pin 50 is inserted into position, it interlocks hitch ball 40 with ball mount platform 30 and prevents hitch ball 40 from rotating. Consequently, hitch ball 40 may be fastened to and unfastened from ball mount 30 with the use of only one tool. Locking pin 50 is preferably made of steel, plastic or other suitable material, and, although illustrated in cylindrical shape, locking pin 50 and throughbores 34 and 46 need not be of cylindrical shape, but, in conforming configurations, may be in the form of other shapes such as, but not limited to, D shaped, star shaped, square shaped, rectangular shaped, triangular shaped, pentagon shaped, hexagon shaped, octagon shaped, etc.

Figure 3:
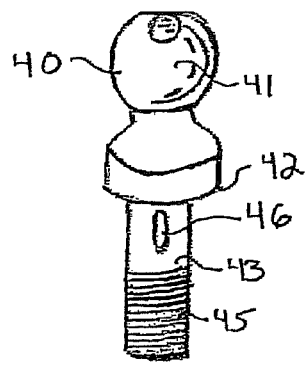
FIG. 3 is an elevation view of the trailer ball of the first embodiment of the Multi-Function Anti-Rotational/Anti-Theft Hitch Ball Assembly of FIG. 1.

As shown in FIG. 3, to optimize locking pin alignment, throughbore 46 in hitch ball 40 may have a vertical slot-type configuration, rather than cylindrical configuration.

Figure 4:
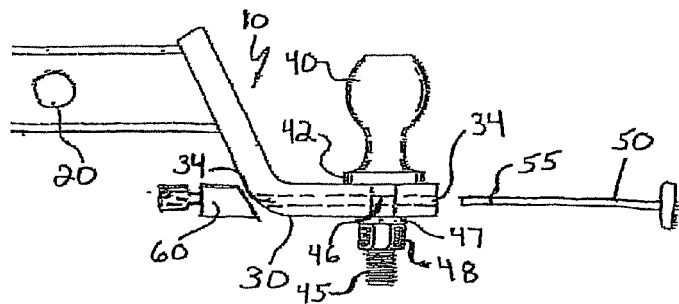
FIG. 4 is a side elevation view of the first embodiment of the Multi-Function Anti-Rotational/Anti-Theft Hitch Ball Assembly of FIG. 1.
Figure 5:
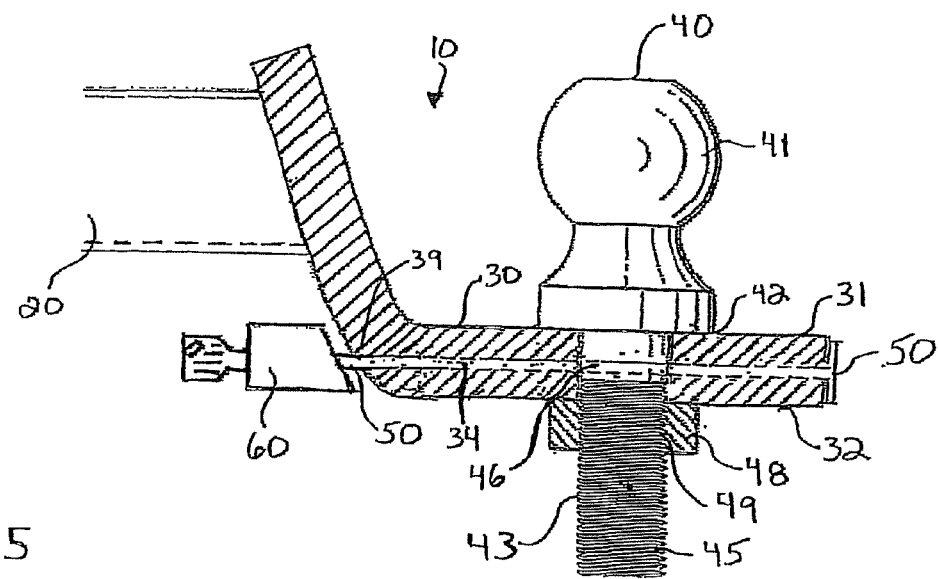
FIG. 5 is an exploded side elevation view of the first embodiment of the Multi-Function Anti-Rotational/Anti-Theft Hitch Ball Assembly of FIG. 1.

As shown in FIGS. 2, 4 and 5, hitch ball 40 is anchored to ball mount platform 30 with locking washer 47 and cooperating fastener 48. Cooperating fastener 48 contains an internal thread convolution 49 that engages with external thread convolution 45 on hitch ball 40 when tightening hitch ball 40 on ball mount platform 30. When lock 60 is attached to locking pin 50, the hitch ball assembly not only functions as an anti-rotational hitch ball assembly, but also functions as an anti-theft hitch ball assembly as well.

Figure 6:
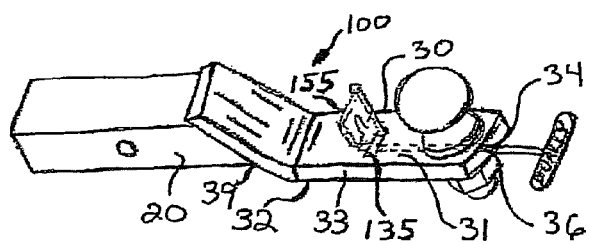
FIG. 6 is a perspective view of an alternative embodiment of the Multi-Function Anti-Rotational/Anti-Theft Hitch Ball Assembly utilizing an alternate locking method.
Figure 7:
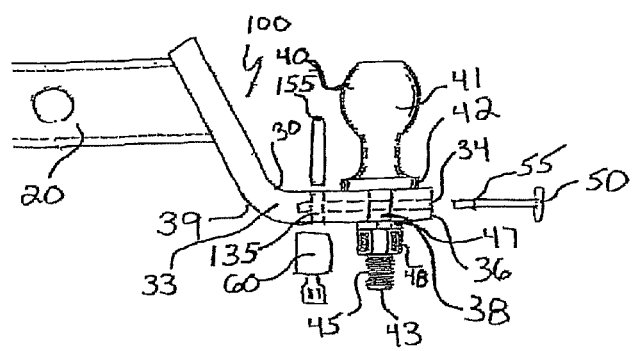
FIG. 7 is a side elevation view of the alternative embodiment of the Multi-Function Anti-Rotational/Anti-Theft Hitch Ball Assembly of FIG. 6.
Figure 8:
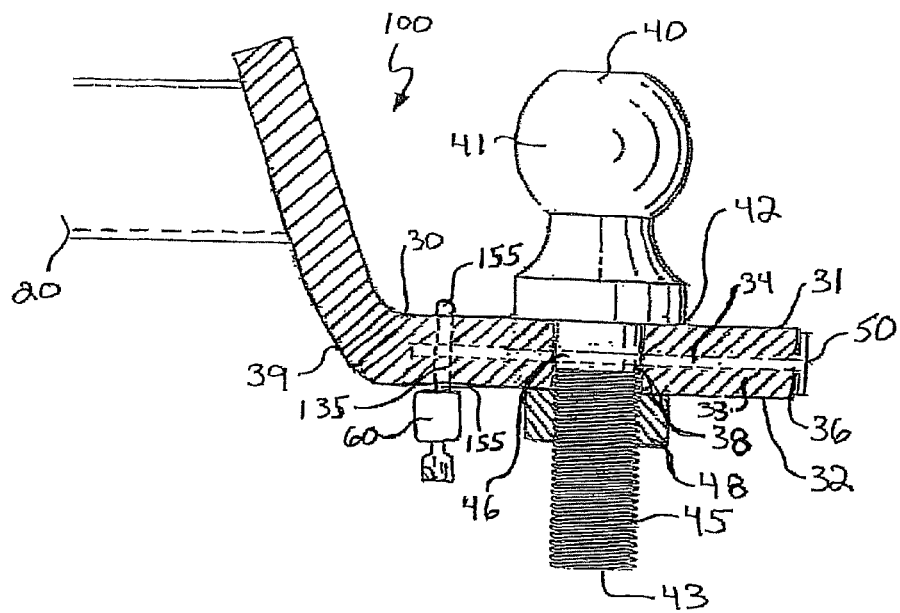
FIG. 8 is an exploded side elevation view of the alternative embodiment of the Multi-Function Anti-Rotational/Anti-Theft Hitch Ball Assembly of FIG. 6.

Referring to FIGS. 6, 7 and 8 there is shown a perspective view, side elevation view and exploded side elevation view of a second embodiment of the present invention referred to by Reference Number 100. This embodiment is similar to the embodiment of Reference Number 10 as described above but utilizes a shorter locking pin 50 and an alternate locking mechanism.

In the illustrated embodiment, throughbore 34 in ball mount platform 30 extends horizontally from the center rear face of the ball mount platform 36, passing through the center of vertical throughbore 38, but does not project through the center forward face of the ball mount platform 39 underneath ball mount shank 20 as in the first embodiment. In this embodiment, throughbore 34 in ball mount platform 30 extends horizontally from the center rear face of the ball mount platform 36, passing through the center of vertical throughbore 38, but stops at a distance between vertical throughbore 38 and forward face of ball mount platform 39.

As best seen in FIG. 6, ball mount platform 30 also contains a rectangular slot 135, although other shapes may be used, extending from ball mount platform topside 31 through the body section 33 and projecting through bottom side of ball mount platform 32 for housing locking plate 155. One edge of locking plate 155 is comprised of a cylindrical shaped shank, although other shaped shanks may be used, that protrudes through bottom side of ball mount platform 32 when the locking plate is positioned within the body section of ball mount platform 33 and engaged with the recess 55 of locking pin 50. The locking plate 155 is of a thin rectangular shape, although other shapes may be used. The center of locking plate 155 has an opening to engage the recess 55 of locking pin 50 when locking pin 50 is inserted into position and locking plate 155 positioned within the body section of ball mount platform 33. As best seen in FIG. 8, with both locking pin 50 in position and locking plate 155 positioned within the body section of ball mount platform 33 and engaged with the recess 55 of locking pin 50, the cylindrical shaped shank of locking plate 155 protrudes through bottom side of ball mount platform 32 and lock 60 attached thereto. When hitch ball 40 is installed on ball mount platform 30 and locking pin 50 and locking plate 155 inserted into position, lock 60 engages locking plate 155 resulting in anti-rotational and anti-theft hitch ball assembly 100.

Referring to FIGS. 9 and 10A, there is shown another embodiment of the present invention referred to by Reference Number 200. This embodiment is similar to the embodiments of Reference Numbers 10 and 100 described above but utilizes an even shorter locking pin 50. In the illustrated embodiment, throughbore 34 in ball mount platform 30 extends horizontally from the center rear face of the ball mount platform 36 into vertical throughbore 38. Unlike the previous embodiments, in this embodiment, bore 246 in hitch ball 40 does not need to, although it may, extend completely through hitch ball shank 43 as previously shown in FIGS. 1-8 as throughbore 46, but may be a bore extending only partially into the hitch ball shank 43, shown in FIGS. 9 and 10A as bore 246. As shown, when installed, locking pin 50 only needs to extend from the center rear face of ball mount platform 36 into bore 246 of hitch ball 40. When hitch ball 40 is installed on ball mount platform 30 and locking pin 50 inserted into position and engaged with hitch ball 40, the assembly functions as anti-rotational hitch ball assembly 200.

As can easily be understood by one skilled in the art, with the use of the short locking pin 50 in this embodiment, there may be insufficient room on ball mount platform 30 to utilize one of the locking methods disclosed in the previous embodiments. Thus, this embodiment utilizes an alternate anti-theft locking method and embodies the inventive lock illustrated in FIG. 10A. As best seen in FIG. 10A, hitch ball 40 has an additional throughbore 290 in shank 43 located on shank 43 at a distance to be under cooperating fastener 48 when hitch ball 40 is securely fastened to ball mount platform 30. To complete the anti-theft feature of this embodiment, center pin 292 between shackle ends 293 of lock 291 is inserted through throughbore 290 and locked to hitch ball shank 43 resulting in anti-rotational and anti-theft hitch ball assembly 200. Although inventive lock 291 with center pin 292 is the preferred lock for use in this embodiment, it should be apparent to those skilled in the art that numerous type locks widely known and available in the market can be inserted through throughbore 290 to complete and attain the anti-theft hitch ball facet—e.g., a single-pin barrel-type lock can be inserted through throughbore 290 and locked to hitch ball shank 43 or one shackle end 293 of a standard padlock inserted through throughbore 290 and locked to hitch ball shank 43. The anti-theft locking method of this embodiment may be applied to any of the embodiments of this application. In conjunction with the use of a lock in throughbore 290, ball mount shank protective cover 295 may be used to protect the external threads 45 on ball mount shank 43 from any potential wear from contact with lock shackle ends 293. Before attaching lock 291 to ball mount shank 43, ball mount shank protective cover 295 is placed over ball mount shank 45 and apertures 296 of ball mount shank protective cover 295 aligned with throughbore 290 in ball mount shank 45. When properly aligned, lock 291 is inserted through ball mount shank protective cover and hitch ball shank and locked in place. Ball mount shank protective cover 295 may be made from steel, tin, aluminum, plastic, rubber, foam rubber, Styrofoam or other suitable material and need not necessarily contain apertures 296 to be attached to hitch ball shank 43. Based upon the material composition such as foam rubber, ball mount shank protective cover 295 may have a hollow cavity slightly smaller in diameter than the diameter of ball mount shank 43, and, thus, when pressed onto ball mount shank 43, held in place by a compressed fit.

Figure 10B:
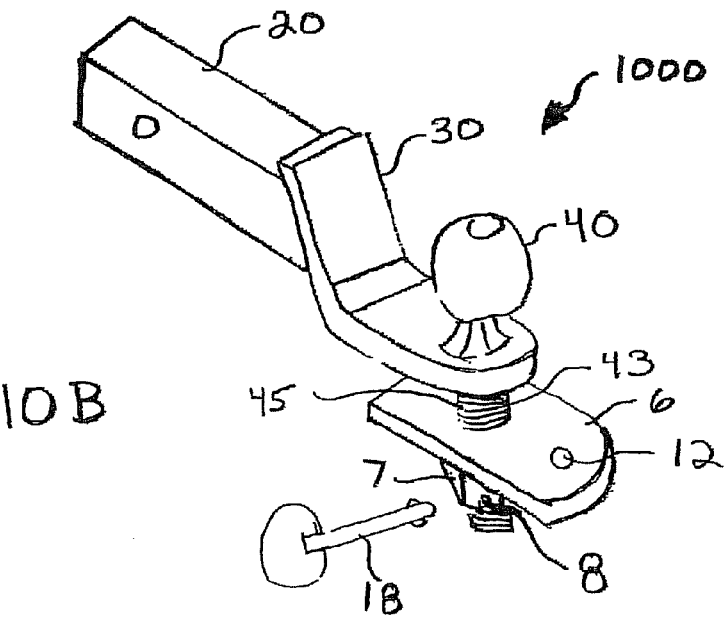
FIG. 10B is a rear perspective view of another embodiment of the Multi-Function Anti-Rotational/Anti-Theft Hitch Ball Assembly.
Figure 12:
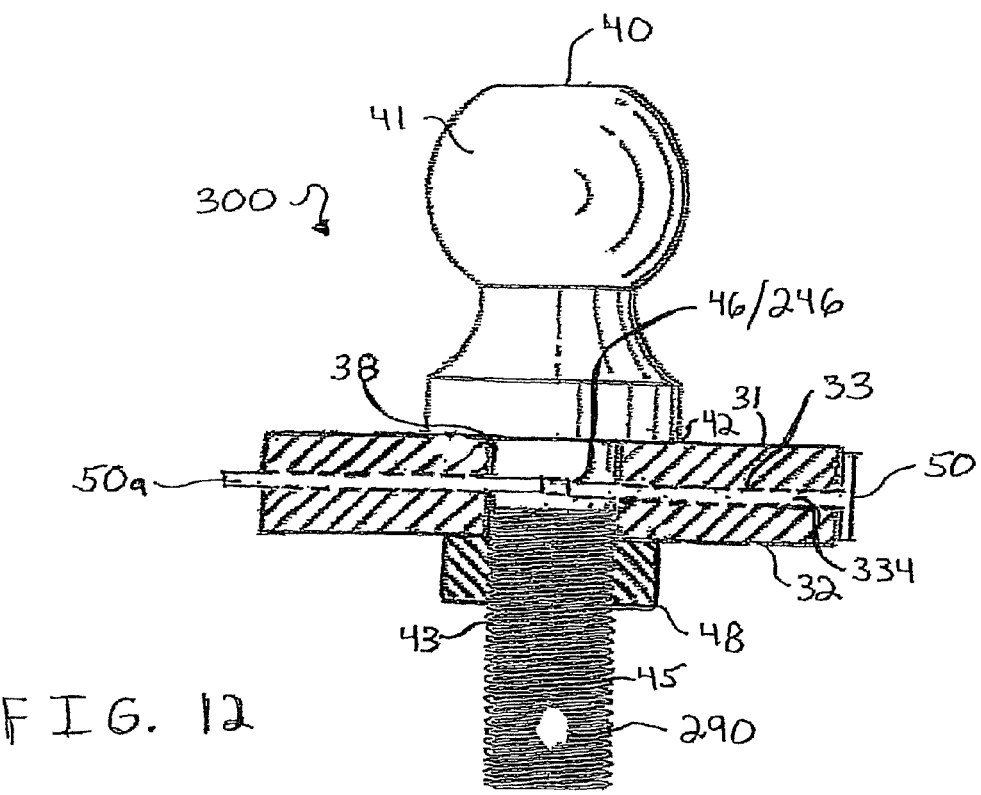
FIG. 12 is an exploded cross-sectional elevation view of the alternative embodiment of the Multi-Function Anti-Rotational/Anti-Theft Hitch Ball Assembly of FIG. 11.

Referring to FIGS. 10B through 10F, there is shown an alternate use of hitch ball throughbore 290 shown in FIGS. 10A and 12 and/or hitch ball throughbore 46 shown in FIG. 3. In U.S. patent application Ser. No. 11/372,748, I described in Paragraphs 56 through 67, illustrated in FIGS. 2A, 2B, 3A, 3B and 8, and claimed in claims 10 and 14, a ball mount platform extension tab. In U.S. patent application Ser. No. 11/372,748, the ball mount platform extension tab is secured in the extended position (positioned parallel with the ball mount) by tightening trailer ball nut 20. The broached surface and/or tightening bar embodying that application assists in maintaining the ball mount platform extension tab in the extended position. Rotating the ball mount platform extension tab to an alternate position, such as a retracted position, necessitates the use of tools. In U.S. patent application Ser. No. 11/372,748, trailer ball nut 20 needs loosened, the ball mount extension tab rotated, and the trailer ball nut 20 retightened once the extension tab is repositioned, such as in a retracted position. As shown in FIGS. 10B through 10F, this application embodies an additional method of easily locking ball mount platform extension tab 6 in an extended or retracted position by utilizing hitch ball throughbores 46 and/or 290.

Figure 10C:
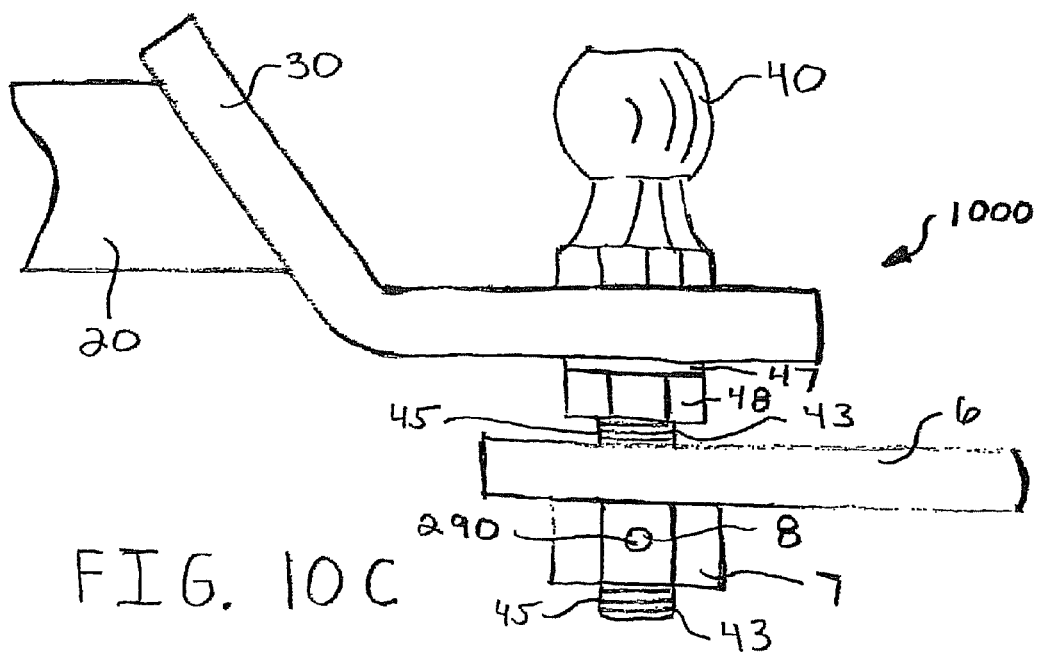
FIG. 10C is a side elevation view of the embodiment of the invention of FIG. 10B.
Figure 10D:
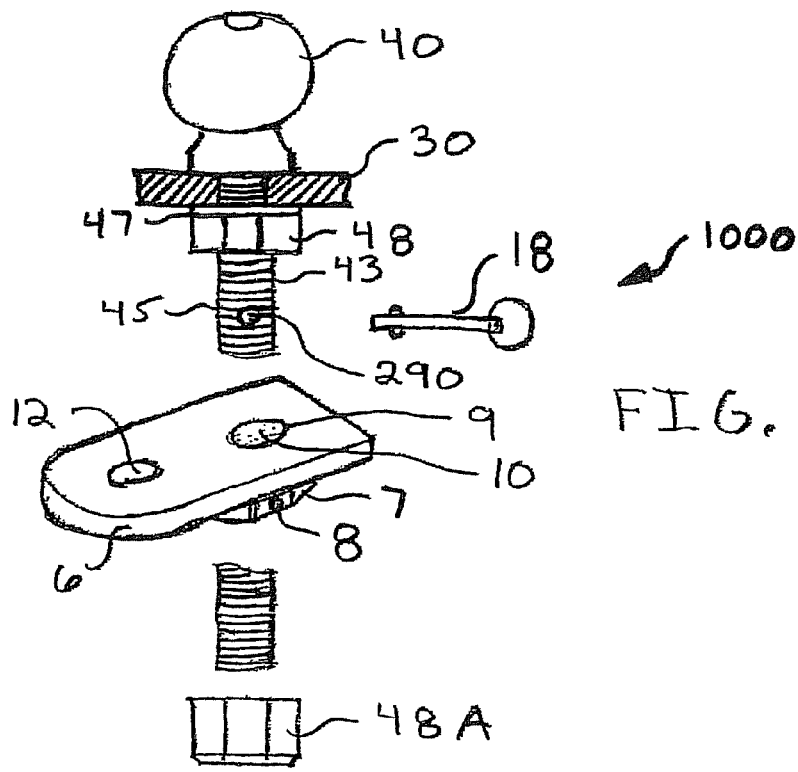
FIG. 10D is a partially exploded side rear perspective view of the invention of FIG. 10B.

Referred to by Reference Number 1000, there are shown in FIGS. 10B, 10C and 10D, a rear perspective view, side elevation view and partially exploded side-rear perspective view, respectively, of an embodiment utilizing hitch ball throughbore 290 to secure ball mount platform extension tab 6 in an extended or retracted position. As best seen in FIG. 10D, ball mount platform extension tab 6 has throughbore 12 for uses such as towing a trailer with a bifurcated trailer tongue utilizing a clevis pin connection or attaching a shackle, and throughbore 9 for fastening ball mount platform extension tab 6 to trailer ball shank 43. After inserting trailer ball 40 through ball mount platform 30, locking washer 47 and cooperating fastener 48 are attached to trailer ball shank 43 and cooperating fastener 48 tightened to the appropriate torque. As shown in FIGS. 10B, 10C and 10D, ball mount platform extension tab 6 has a spacer or fastener 7 attached to either its topside or underside (such as by welding, press-fit, forged, etc.) and aligned with throughbore 9 for additional support surface when securing ball mount platform extension tab 6 to trailer ball shank 43. As best seen in FIG. 10D, throughbore 9 and spacer or fastener 7 may have an internal thread convolution 10 to engage with trailer ball shank external thread convolution 45 for fastening ball mount platform extension tab 6 to trailer ball shank 43. As also shown in FIGS. 10B, 10C and 10D, spacer or fastener 7 on ball mount platform extension tab 6 has throughbore 8 to align with throughbore 290 on trailer ball shank 43 when ball mount platform extension tab 6 is installed on trailer ball shank 43. As with the embodiment shown in FIG. 3, like throughbore 46, to optimize locking pin alignment, throughbore 290 on trailer ball shank 43 may have a vertical slot-type configuration, rather than cylindrical configuration. In addition, throughbore 290 need not necessarily be a complete throughbore, but may be just one or more bores bored partially into trailer ball shank 43. In addition, the number and location of bores on trailer ball shank 43 are not limited to the type, number and locations shown in the drawings. With this embodiment, ball mount platform extension tab 6 is attached to trailer ball shank 43 by turning or threading ball mount platform extension tab 6 onto trailer ball shank 43. When properly installed, throughbore 8 on ball mount platform extension tab 6 aligns with throughbore 290 on trailer ball shank 43. For use in the extended position, ball mount platform extension tab 6 is positioned parallel with ball mount platform 30 exposing portion of ball mount platform extension tab 6 containing throughbore 12 rearward of trailer ball 40 in the extended position. Ball Mount platform extension tab 6 is then secured to trailer ball shank 43 and maintained in the extended and useable position by inserting pin (such as detent ring pin 18 as shown) through throughbores 8 on ball mount platform extension tab 6 and 290 on trailer ball shank 43. To position ball mount platform extension tab 6 in a stowed position, ring pin 18 is removed, ball mount platform extension tab 6 rotated ½ turn, and ring pin 18 reinserted through throughbores 8 on ball mount platform extension tab 6 and 290 on trailer ball shank 43. By including an additional throughbore 290 in trailer ball shank 43 perpendicular to first throughbore 290, ball mount platform extension tab 6 may be rotated ¼ turn, and ring pin 18 reinserted through throughbores 8 on ball mount platform extension tab 6 and 290 on trailer ball shank 43. In this position, ball mount platform extension tab 6 will be positioned at a right angle to ball mount platform 30 and ball mount platform extension tab 6 may be used as a mount for attaching a sway control device. In lieu of detent ring pin 18, a conventional locking-type pin (as shown in FIG. 10L as 18A) may be used to prevent unauthorized or unintended removal of the ball mount platform extension tab 6 from trailer ball shank 43. By utilizing ball mount platform extension tab 6 in conjunction with a conventional locking-type pin 18, the trailer ball assembly also functions as an Anti-Theft Hitch Ball Assembly, since neither ball mount platform extension tab 6 nor trailer ball fastener 48 can be removed from trailer ball shank 43.

Referring to FIG. 10D, in another embodiment, throughbore 9 and spacer or fastener 7 need not have internal thread convolution 10. Alternatively, throughbore 9 may be a smooth bore, and ball mount platform extension tab 6 simply slid onto trailer ball shank 43. With this embodiment, once ball mount platform extension tab 6 is placed on trailer ball shank 43 and locking pin 18 inserted into position, fastener 48A (shown as a locking nut) is threaded onto trailer ball shank 43. Fastener 48A may also be any locking mechanism that is attached to and locked to trailer ball shank 43 under ball mount platform extension tab 6. In addition, fastener or locking mechanism 48A may be used independent of the use of ball mount platform extension tab 6 and still function as an Anti-Theft Hitch Ball Assembly.

Figure 10E:
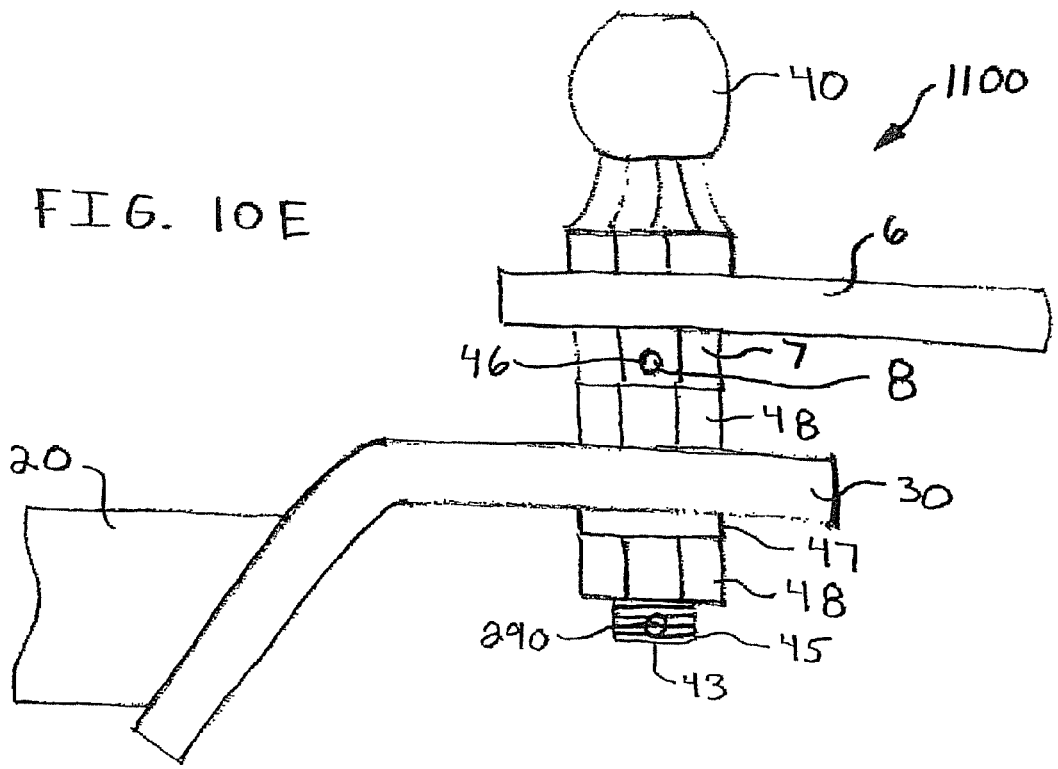
FIG. 10E is a side elevation view of another embodiment of the Multi-Function Anti-Rotational/Anti-Theft Hitch Ball Assembly similar to the embodiment of FIG. 10C, but assembled on the ball mount platform with an alternate method.
Figure 10:
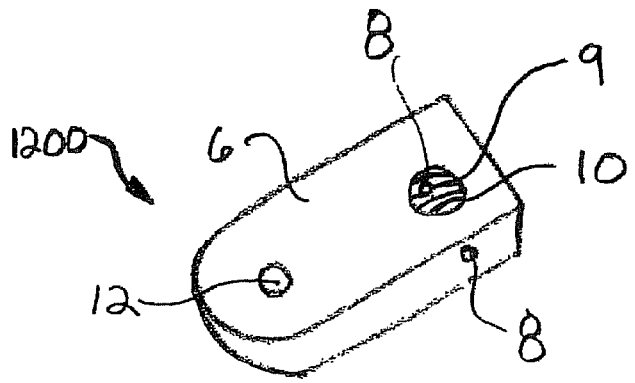
FIG. 10A is an exploded side elevation view of the alternative embodiment of the Multi-Function Anti-Rotational/Anti-Theft Hitch Ball Assembly of FIG. 9.
FIG. 10F is a rear perspective view of another embodiment of the invention.
FIG. 10G is a side elevation view of another embodiment Multi-Function Anti-Rotational/Anti-Theft Hitch Ball Assembly.
FIG. 10H is a rear elevation view of the invention of FIG. 10G.
FIG. 10I is a bottom rear side perspective view of the invention of FIG. 10G.
FIG. 10J is a rear elevation view of another embodiment of the invention similar to the embodiment of FIG. 10G, but with a modified attachment plate.
FIG. 10K is a bottom rear side perspective view of the invention of FIG. 10J.
FIG. 10L is a partially exploded rear perspective view of another embodiment of the Multi-Function Anti-Rotational/Anti-Theft Hitch Ball Assembly.
FIG. 10M is an exploded rear elevation view of another embodiment similar to the embodiment of FIG. 10J with a modified retaining bracket.
FIG. 10N is an exploded perspective view of another embodiment of the Multi-Function Anti-Rotational/Anti-Theft Hitch Ball Assembly utilizing an alternate method of interlocking the hitch ball with the ball mount.
FIG. 10O is an exploded rear elevation view of an embodiment of FIG. 10N.
FIG. 10P is an exploded perspective view of another embodiment similar to the embodiment of FIG. 10N with yet another modified retaining bracket.
FIG. 10Q is an exploded perspective view of several exemplary embodiments of the embodiment of FIG. 10N.
FIG. 10R is an exploded perspective view of yet another exemplary embodiment of the embodiment of FIG. 10N.
FIG. 10S is an exploded perspective view of another embodiment of FIG. 10N with yet another modified retaining bracket useful for applications on nonrectangular shaped ball mount platforms or ball mounting surfaces.
FIG. 10T is an exploded perspective view of another embodiment of FIG. 10N with yet another modified retaining bracket useful for applications on nonrectangular shaped ball mount platforms or ball mounting surfaces.
Figure 10:
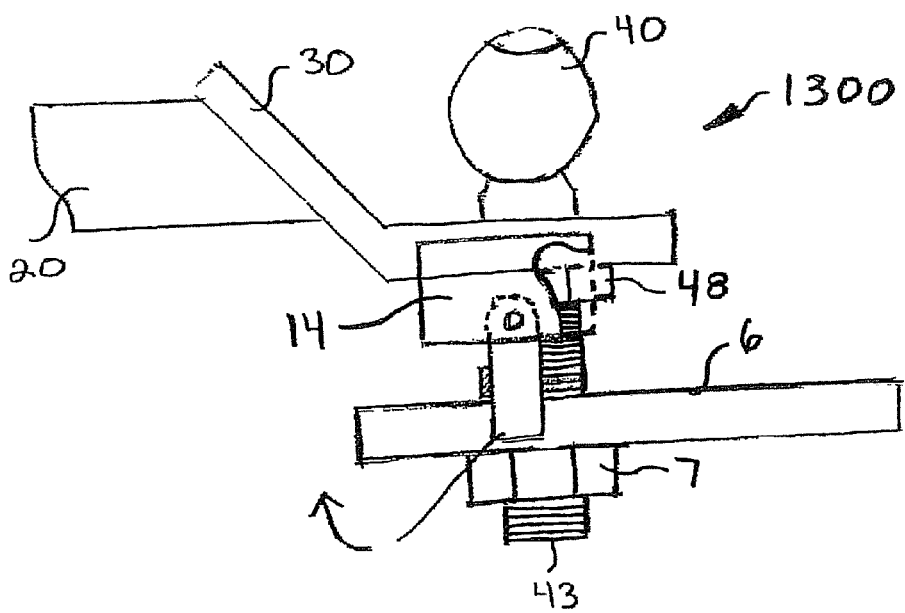

Referred to by Reference Number 1100, there is shown in FIG. 10E a side elevation view of another embodiment of the Multi-Function Anti-Rotational/Anti-Theft Hitch Ball Assembly similar to the embodiment of FIGS. 10B through 10D, but assembled on the ball mount platform in an alternate fashion. In this embodiment, ball mount platform 6 is placed on ball mount shank 43 and fastener 48 threaded onto ball mount shank 43. Ball mount shank 43 is then inserted through ball mount platform 30 and anchored to ball mount platform 30 with locking washer 47 and cooperating fastener 48. As with the previous embodiment, ball mount platform extension 6 may, or may not, contain internal thread convolution 10 shown in FIG. 10D. For use in the extended position, ball mount platform extension tab 6 is positioned parallel with ball mount platform 30 exposing portion of ball mount platform extension tab 6 containing throughbore 12 rearward of trailer ball 40 in the extended position. Ball Mount platform extension tab 6 is then secured to trailer ball shank 43 and maintained in the extended and useable position by inserting pin (such as detent ring pin) through throughbores 8 on ball mount platform extension tab 6 and 46 on trailer ball shank 43. To position ball mount platform extension tab 6 in a stowed position, detent ring pin is removed, ball mount platform extension tab 6 rotated ½ turn, and ring pin reinserted through throughbores 8 on ball mount platform extension tab 6 and 46 on trailer ball shank 43. By including an additional throughbore 46 in trailer ball shank 43 perpendicular to first throughbore 46, ball mount platform extension tab 6 may be rotated ¼ turn, and ring pin reinserted through throughbores 8 on ball mount platform extension tab 6 and 46 on trailer ball shank 43. In this position, ball mount platform extension tab 6 will be positioned at a right angle to ball mount platform 30 and ball mount platform extension tab 6 may be used as a mount for attaching a sway control device. A locking mechanism or locking pin may be attached to trailer ball shank 43 under cooperating fastener 48 optionally utilizing bore or throughbore 290 resulting in an anti-theft hitch ball assembly. In addition, locking mechanism or locking pin attached to trailer ball shank 43 may be used independent of the use of ball mount platform extension tab 6 and still function as an Anti-Theft Hitch Ball Assembly.

Referring to FIG. 10F there is shown a rear perspective view of another embodiment of the invention referred to by Reference Number 1200. In this embodiment, ball mount platform extension tab 6 may not contain spacer/fastener 7. Without spacer/fastener 7, throughbore 8 is positioned directly in the side of ball mount platform extension tab 6 and aligned with the center of throughbore 9. Throughbore 9 may or may not contain internal thread convolution 10. In this embodiment, ball mount platform extension tab 6 is assembled to trailer ball shank 43 and operated in the same manner as described in the previous embodiments.

As can be appreciated by one skilled in the art, the trailer hitch ball assemblies of the embodiments previously described and illustrated in FIGS. 10A through 10F not only apply to use on a conventional ball mount, but also apply to applications on any other suitable mounting surfaces such as an ATV hitch mounting bracket, ATV trailer ball mounting bracket, rear tractor shroud, hitch or trailer ball bracket or plate or any other suitable surface on any type of vehicle that can be used for towing.

Figure 10H:
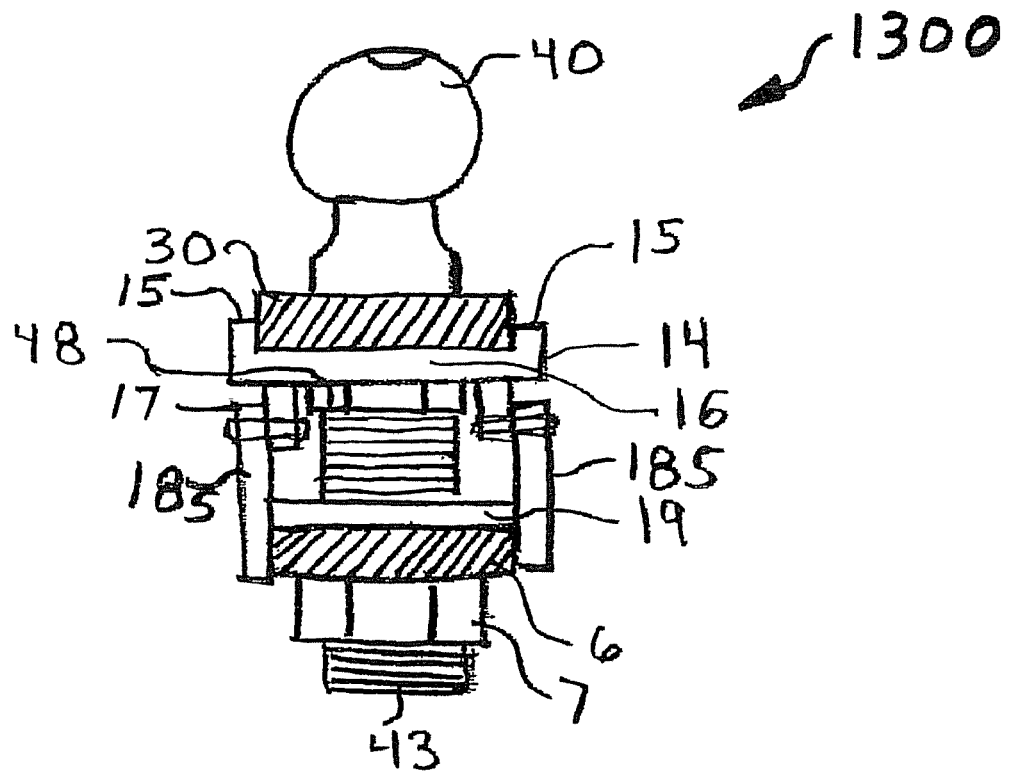
Figure 10I:
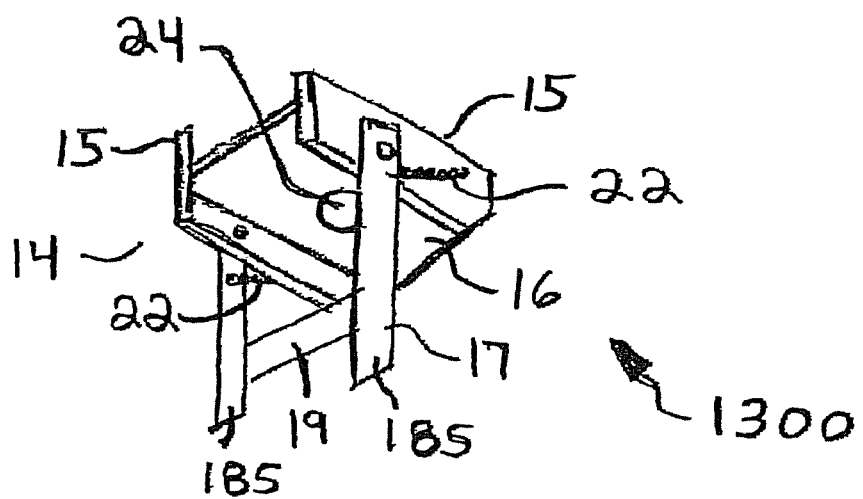

Referred to by Reference Number 1300, there are shown in FIGS. 10G, 10H and 10I a side elevation view, rear elevation view and bottom rear side perspective view, respectively, of another embodiment of the Anti-Rotational/Anti-Theft Hitch Ball Assembly utilizing an alternate method of securing ball mount platform extension tab 6 in an extended or retracted position. With this embodiment, in lieu of pinning ball mount platform extension tab 6 in the desired position with pin 18, ball mount platform extension tab 6 is maintained in an extended or retracted position with the use of ball mount platform extension tab retaining bracket 14. As shown in FIG.

10G, ball mount platform extension tab retaining bracket 14 is a bracket secured to the assembly with trailer ball 40 and fastener 48.

As best seen in FIG. 10H, ball mount platform extension tab retaining bracket 14 is secured to underside of ball mount platform 30 with fastener 48. The sides 15 of ball mount platform extension tab retaining bracket 14 may protrude above mounting plate 16 to interlock ball mount platform extension tab retaining bracket 14 with ball mount platform 30 to reduce or eliminate retaining bracket 14 from potentially spinning, turning or rotating when swing arm 17 is interlocked with ball mount platform extension tab 6 and torque applied to ball mount platform extension tab 6.

As best seen in FIG. 10I, swing arm 17 consists of two sides 18S and cross member 19. Sides 18S extend lower than cross member 19 resulting in an interlock connection with ball mount platform extension tab 6 when swing arm 17 is positioned in the engaged position as shown in FIG. 10H. Swing arm 17 is attached to mounting plate 16, sides 15 or additional structure with rivets, bolts, pins or the like and may include spring 22 or other biasing mechanism to assist in maintaining swing arm 17 in an interlocked position with ball mount platform extension tab 6. Ball mount platform extension tab retaining bracket 14 is secured to underside of ball mount platform 30 by placing ball mount shank 43 through ball mount platform 30 and throughbore 24 of ball mount platform extension tab retaining bracket 14 and securing with fastener 48. Ball mount platform extension tab 6 is installed on trailer ball shank 43 the same as described in the embodiment of FIGS. 10B through 10D above. Ball mount platform extension tab 6 is locked in the extended or retracted position with swing arm 17. Swing arm 17 is rotated forward on its axis, ball mount platform extension tab 6 positioned in the extended or retracted position, and swing arm 17 released to engage and lock ball mount platform extension tab 6 in the desired position.

Figure 10J:
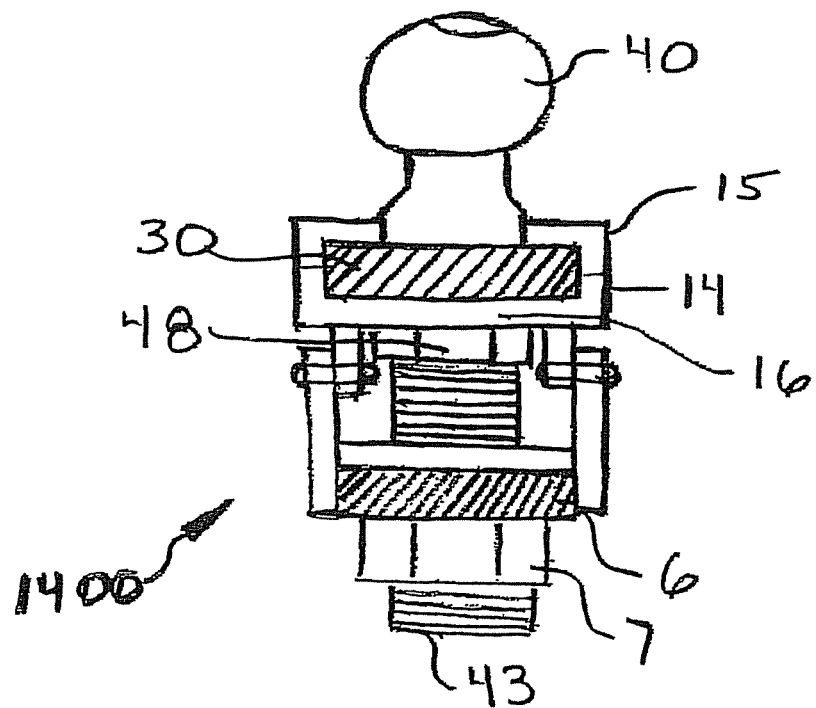
Figure 10K:
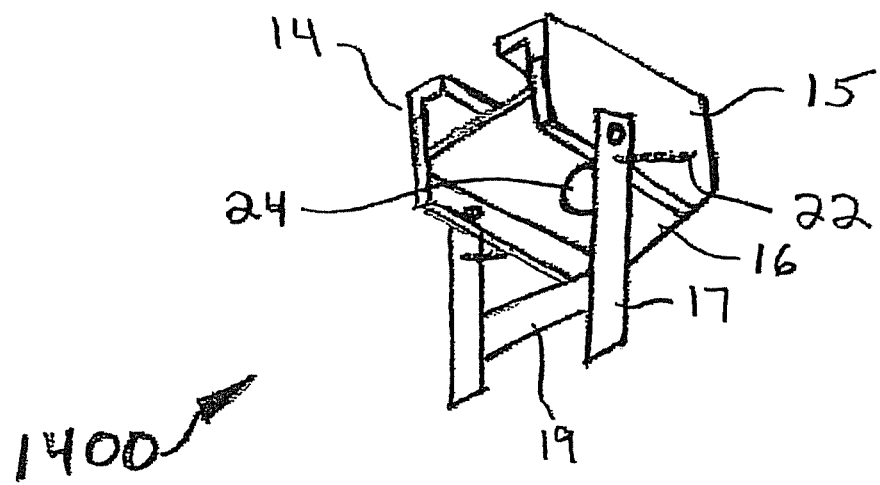
Figure 10L:
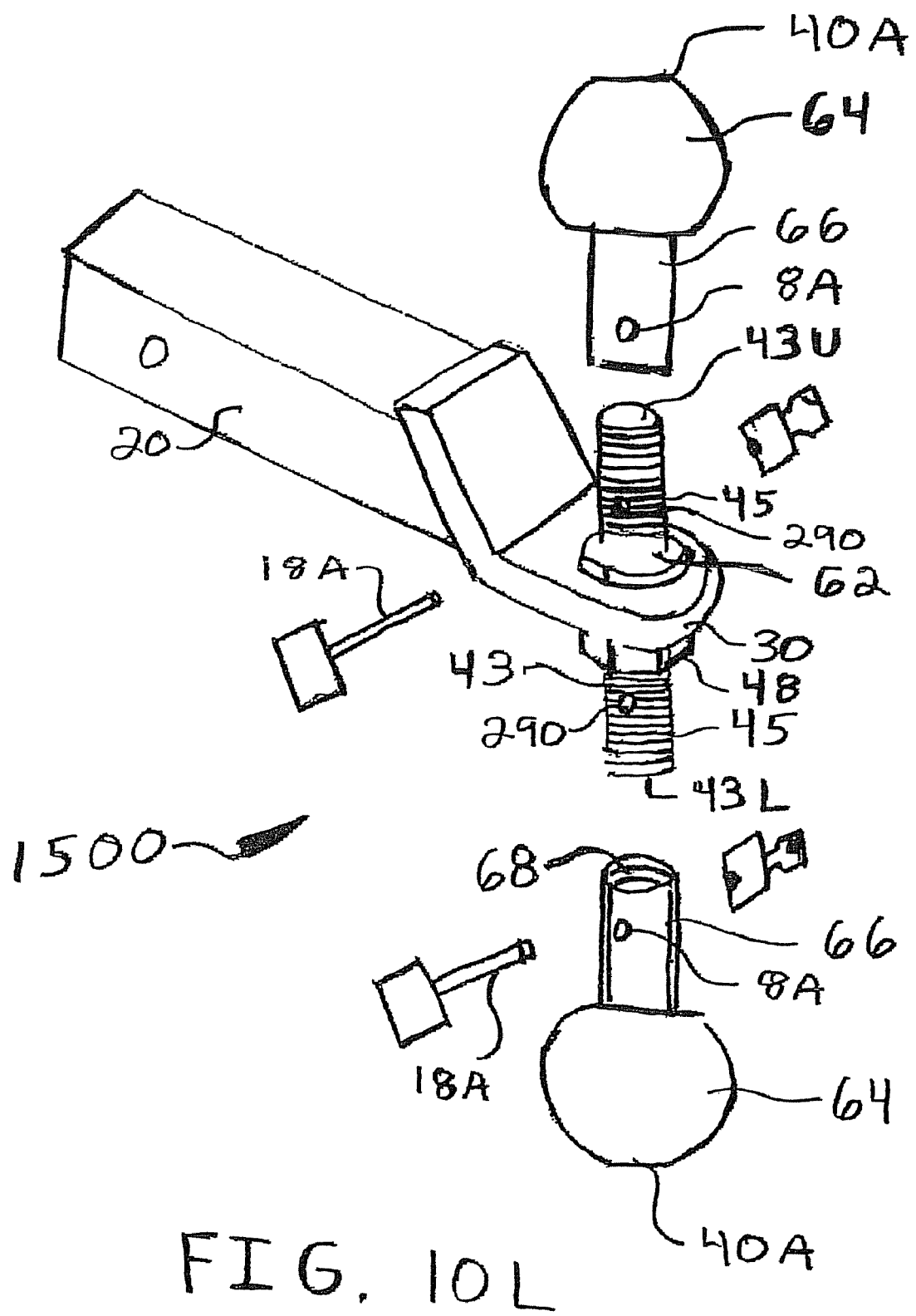
Figure 10M:
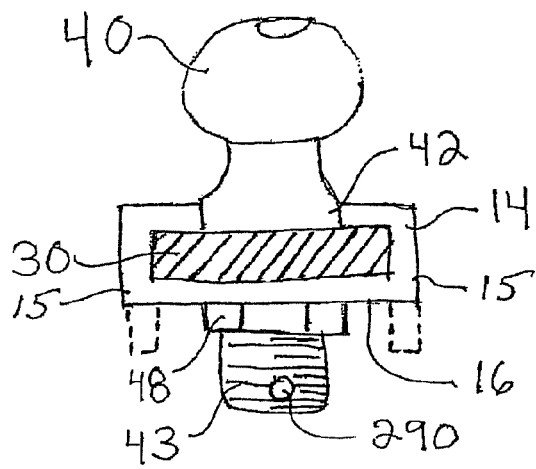

Referred to by Reference Number 1400, there are shown in FIGS. 10J and 10K a rear elevation view and bottom rear side perspective view, respectively, of another embodiment of the Anti-Rotational/Anti-Theft Hitch Ball Assembly similar to the embodiment of FIGS. 10H and 10I with a modified ball mount platform extension tab retaining bracket 14. With this embodiment, retaining bracket 14 sides 15 extend upward the full height or thickness of ball mount platform 30, then wrap around the top side of ball mount platform 30 extending uniformly toward the center of ball mount platform 30 ending at a distance equal to or slightly greater than the width of a standard wrench flat trailer ball base 62, resulting in ball mount platform extension tab retaining bracket 14 also functioning as an anti-rotational hitch ball bracket and/or assembly. With this embodiment, ball mount platform extension tab retaining bracket 14 is slid onto ball mount platform 30 from the rear, and when throughbore 24 of retaining bracket 14 is aligned with throughbore on ball mount platform, ball mount platform extension tab retaining bracket 14 is secured to the ball mount platform 30 with standard wrench flat trailer ball 40 and fastener 48. Otherwise, the assembly functions the same as the embodiment of FIGS. 10G, 10H and 10I. With this assembly, fastener 48 may be tightened to full torque with the use of one wrench only since the top portion of retaining bracket 14 interlocks with trailer ball base wrench flats preventing trailer ball from turning when tightening fastener 48. In addition, this embodiment may be modified by eliminating swing arm 17 from retaining bracket 14 resulting in retaining bracket 14 functioning exclusively as an anti-rotational trailer ball device as shown in FIG. 10M. In the embodiment of FIG. 10M, retaining bracket 14 sides 15 below mounting plate 16, as represented by the dotted lines, may be eliminated from retaining bracket 14.

Figure 10N:
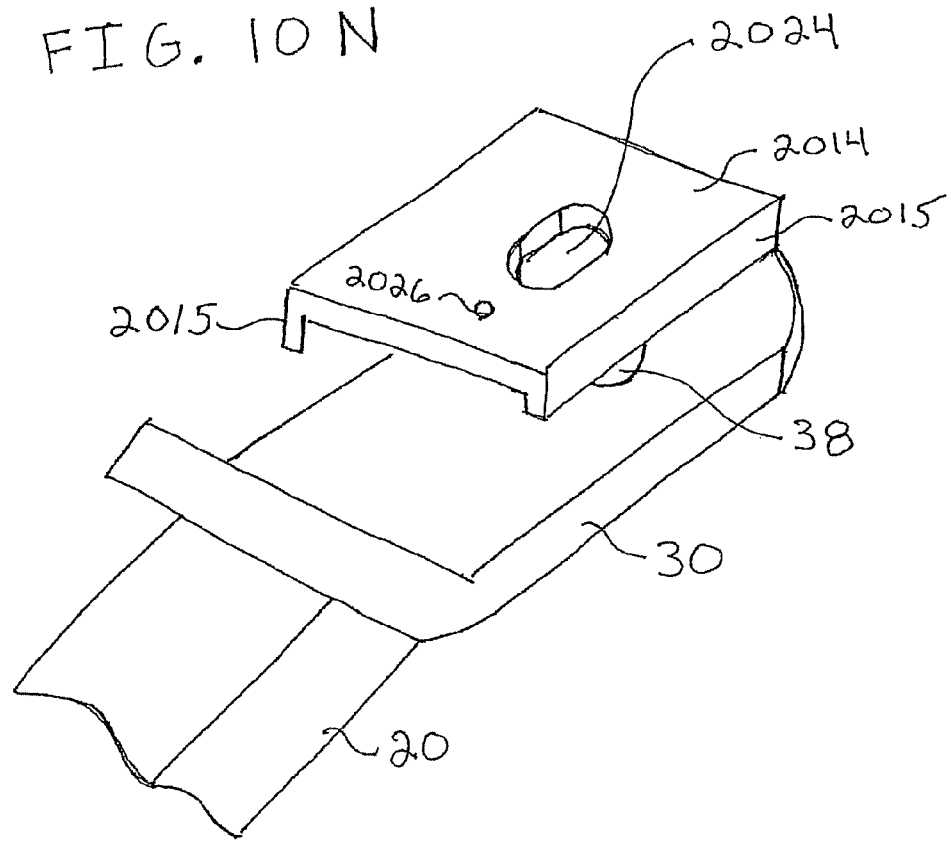
Figure 10:
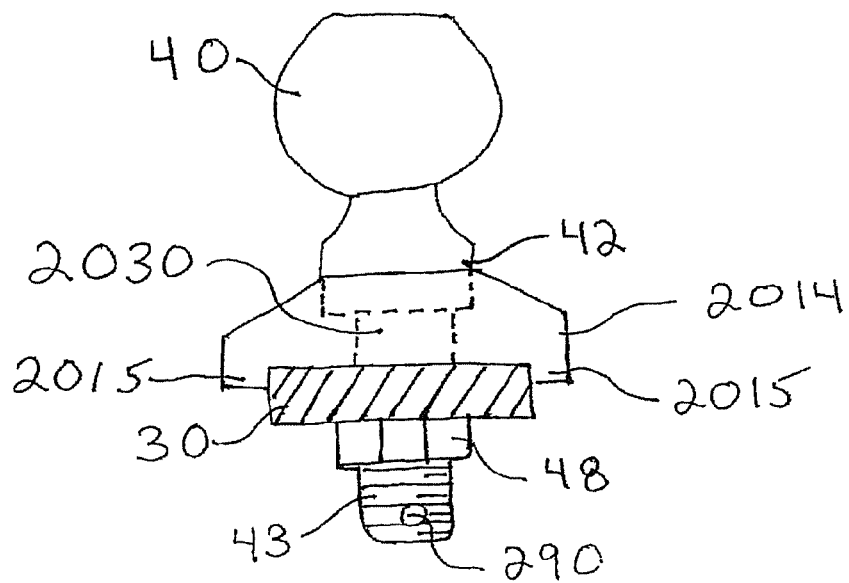
Figure 10:
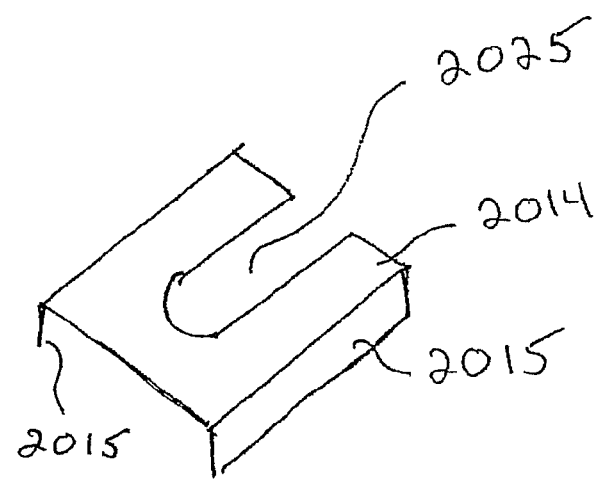
Figure 10:
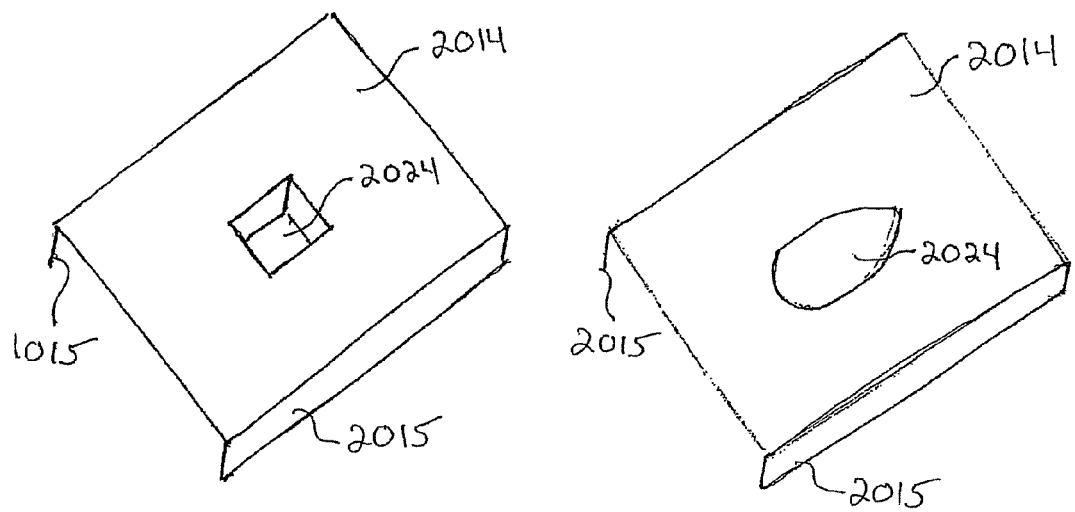
Figure 10:
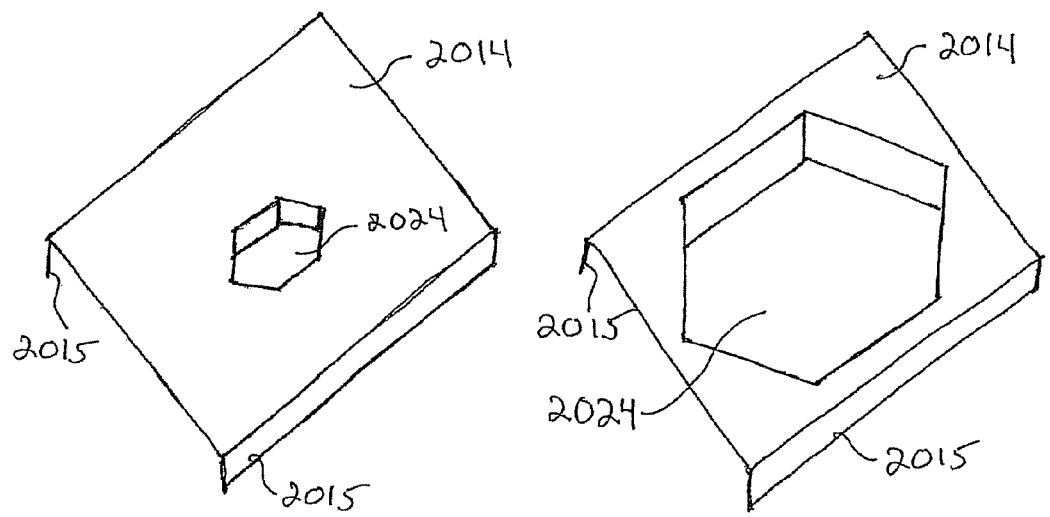

Referring to FIG. 10N, there is shown an exploded perspective view of another embodiment of the Multi-Function Anti-Rotational/Anti-Theft Hitch Ball Assembly utilizing an alternate method of interlocking the hitch ball with the ball mount. In this embodiment, retaining bracket 2014 rests on top of ball mount platform, or other hitch ball mounting surface, and retaining bracket sides 2015 interlock retaining bracket 2014 to ball mount platform 30. Retaining bracket 2014 has aperture 2024 which is shaped to conform to the shape of hitch ball flanges 42. As shown in FIG. 10N, aperture 2024 is shaped to mate with a conventional hitch ball flange consisting of dual wrench flats. Retaining bracket 2014 is placed on ball mount platform 30 and aperture 2024 in retaining bracket 2014 aligned with aperture 38 in ball mount platform 30. Retaining bracket 2014 will be interlocked to ball mount platform 30 by retaining bracket sides 2015. Shank 43 of trailer hitch ball 40 is inserted through apertures 2024 and 38 and lowered into position engaging hitch ball flange 42 with retaining bracket 2014 resulting in an anti-rotational hitch ball assembly. Retaining bracket 2014 may also contain aperture 2026 to fit over press-fit locking pins mounted in and protruding from some ball mount platforms 30. Aperture 2026 will permit retaining bracket 2014 to seat flush on top of all mount platform 30 even when the ball mount platform contains a protruding locking pin. When tightening fastener 48, torque applied to retaining bracket 2014 will retain retaining bracket 2014 in a flush position. Nevertheless, the underneath side of retaining bracket 2014 mounting bracket 16 may consist of a magnetic or adhesive surface.

As shown in FIG. 10O, retaining bracket 2014 is not limited to bracket 2014 being a flat bracket as the embodiment shown in FIG. 10N, nor limited to aperture 2024 being a complete throughbore of corresponding shape with hitch ball flange 42. Retaining bracket 2014 may be of any thickness and tapered as shown, and aperture 2024 may consist of a blind bore—i.e., a circular bore 2030 on the lower portion of retaining bracket 2014 for inserting hitch ball shank 43 through, and an upper bore 2024 sized and shaped to match, engage and interlock hitch ball flange 42. Blind bore embodiment is shown in FIG. 10O with dotted lines.

As shown in FIG. 10P, aperture 2024 may be modified and consist of an elongated cut-out 2025 with one end being open. This embodiment enables retaining bracket 2014 to be inserted after hitch ball 40 is inserted onto ball mount platform 30. In addition, retaining bracket 2014 may be removed from the hitch ball assembly after fastener 48 is torqued. Thus, the interlocking retaining bracket 2014 of this embodiment can also function as a removable tool for hitch ball installation and removal.

Figure 10R:
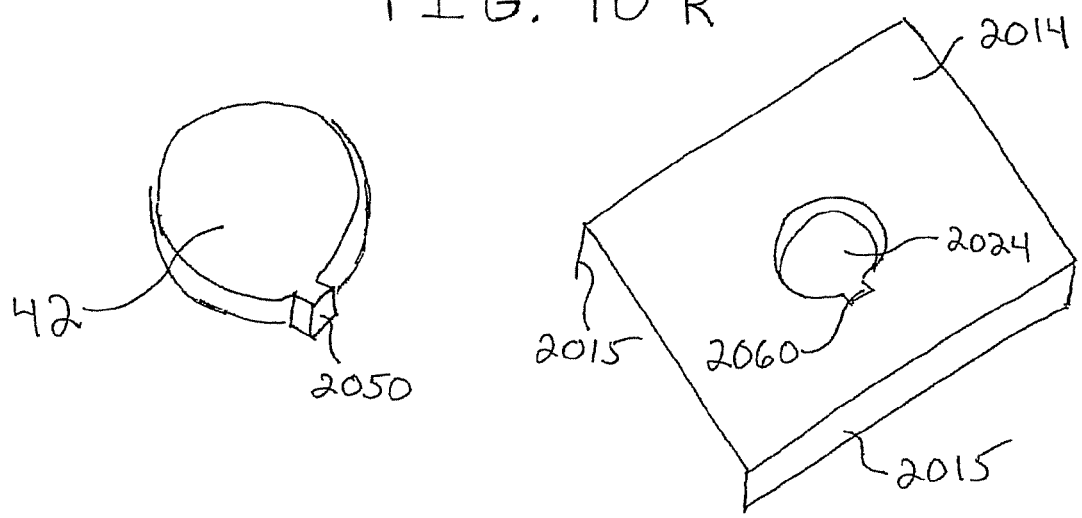

Hitch ball interlocking retaining bracket 2014 is not limited to just interlocking hitch ball flanges consisting of dual wrench flats, but encompasses any hitch ball flange configuration that can result in an interlock. FIG. 10Q is an exploded perspective view showing a few exemplary conventional configurations including square, teardrop and hexagonal configurations. FIG. 10R is an exploded perspective view of an example of a flange/bracket configuration that can result in an interlocking assembly.

Figure 10S:
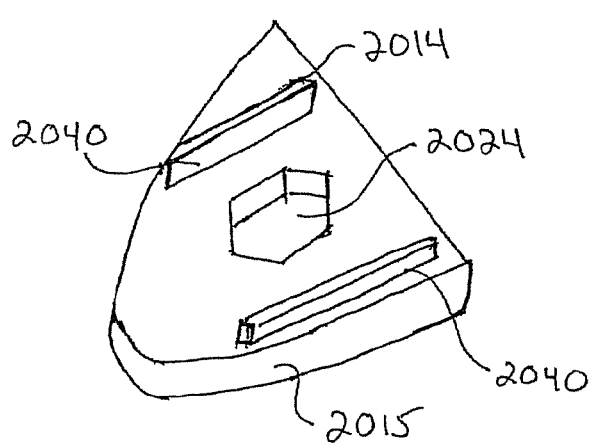

FIG. 10S is an exploded perspective view of another exemplary embodiment of FIG. 10N utilizing a modified retaining bracket useful for applications on nonrectangular shaped ball mount platforms or ball mounting surfaces. In this embodiment, the surface to which interlocking retaining bracket 2014 engages need not be of rectangular shape like a conventional ball mount platform. A non rectangular hitch ball mounting surface/bar/bracket is common on all terrain vehicles (ATVs). FIG. 10S is one exemplary example of an interlocking retaining bracket 2014 modified to engage an ATV configuration. This embodiment, as with the previous and following interlocking retaining bracket embodiments, is not limited to the embodiments specifically illustrated and described but encompasses any and all embodiments within the scope of the claims. As shown, retaining bracket 2014 may include one or two upper interlock flanges 2040 for interlocking additional structure or components on top of interlocking retaining bracket 2014. An example would be interlocking a receiver-type hitch to a nonrectangular ATV hitch ball bracket via use of interlocking retaining bracket 2014. Retaining bracket 2014 may be attached and interlocked to ATV hitch ball bracket and conventional receiver-type hitch placed on top of retaining bracket 2014 between interlock flanges 2040 and the complete assembly attached to ATV with mounting bolt and fastener utilizing throughbore 2024 and existing aperture in ATV hitch ball bracket. Sides 2015 of interlocking retaining bracket 2014 interlock bracket 2104 to ATV, and flanges 2040 interlock conventional ATV receiver hitch to interlocking retaining bracket 2014.

Figure 10T:
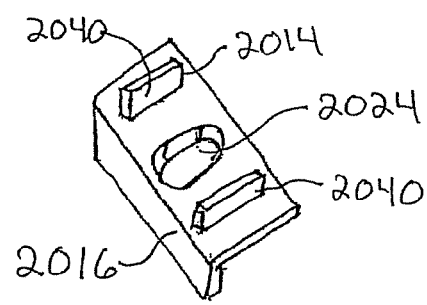

FIG. 10T is an exploded perspective view of another embodiment of FIG. 10N with yet another modified retaining bracket 2014 useful for applications on nonrectangular shaped ball mount platforms or ball mounting surfaces such as lawn and garden tractors. Such tractors frequently have a rear shroud that accommodates the attachment of a hitch ball to the shroud with a flat surface positioned reward of the hitch ball mounting throughbore. As shown in FIG. 10T, interlocking retaining bracket 2014 may include just one side member 2015 to interlock with the rear portion of the tractor's rear shroud or drawbar. As with the embodiment of FIG. 10S, retaining bracket 2014 may include one or two upper interlock flanges 2040 for interlocking additional structure or components on top of interlocking retaining bracket 2014.

Referring to FIG. 10L, there is shown a partially exploded rear perspective view of another embodiment of the Multi-Function Anti-Rotational/Anti-Theft Hitch Ball Assembly referred to by Reference Number 1500. This embodiment shows yet another alternate use of hitch ball throughbore 290 to achieve an interchangeable tow ball assembly with the additional capacity to stow one interchangeable ball 40A on the assembly itself underneath ball mount platform 30. With this embodiment, trailer ball shank 43 does not include a forged trailer ball sphere above trailer ball shank base 62, but rather includes upper shank portion 43U. Upper shank portion 43U of shank 43 above shank base 62 also includes throughbore 290. Although not required or necessary, upper shank portion 43U may optionally consist of an external thread convolution 45 as shown. Lower shank portion 43L of shank 43 below shank base 62 includes throughbore 290, and, consists of an external thread convolution 45 minimally distanced from shank base 62 to fully engage internal thread convolution (not shown) on fastener 48. Although not required or necessary, lower shank portion 43L distanced beneath fastener 48 may optionally consist of an external thread convolution 45. In addition, lower shank portion 43L need not be an extended shank as shown, but may end at a length 2 or 3 threads beneath fastener 48 and still function as an interchangeable tow ball assembly but without the capacity to stow an additional interchangeable ball 40A underneath ball mount platform 30; or lower shank portion 43L may have an even greater extended shank to accommodate the additional attachment of ball mount platform extension tab 6 described in the previous embodiments. Additionally, as can be appreciated by one skilled in the art, in lieu of fastening shank 43 to ball mount platform 30 with fastener 48, shank 43 may be part of a forged ball mount or permanently attached to ball mount platform 30 such as by welding. In addition, shank 43 need not be one continuous shank consisting of upper portion 43U and lower portion 43L, but may be two separate shanks welded to both the upper and lower sides of ball mount platform 30.

When used without external thread convolution 45 on shanks 43U and 43L, shanks 43U and 43L need not be of a cylindrical shape, but in conforming configurations with inside portion of hollow shank 66, may be in the form of other shapes such as, but not limited to, D shaped, star shaped, square shaped, rectangular shaped, triangular shaped, pentagon shaped, hexagon shaped, octagon shaped, etc.

Trailer ball 40A consists of ball sphere 64 and hollow shank 66. Hollow shank 66 contains throughbore 8A and may optionally contain internal thread convolution 68 to mate with external thread convolution on upper shank 43U and/or lower shank 43L.

Like described in the previous embodiments wherein ball mount extension tab 6 and/or trailer ball 40 is threaded onto trailer ball shank 43 and pinned to shank 43 with pin 18, with this embodiment, trailer ball 40A also threads onto trailer ball shank 43U and/or 43L and when throughbore 8A on hollow ball shank 66 aligns with throughbore 290 on shank 43U and/or 43L, pinned to shank 43U and/or 43L with locking pin 18A or detent ring pin 18 shown in FIG. 10D.

The inventive idea of permanently attaching one or more interchangeable ball shanks to ball mount platform 30, such as by welding, not only applies to shank 43 of this invention, but also applies to any interchangeable trailer ball shank or assembly. The inclusion of a second interchangeable trailer ball shank to ball mount platform 30 provides a convenient method of stowing a second ball sphere of a different size on the ball mount, rather than having to stow alternate trailer balls in the vehicle or elsewhere. Additionally, in the current art, conventional ball mounts containing a ball mount platform may be used in either the drop or rise position. With only one interchangeable ball shank attached to the ball mount platform in the conventional manner in either the drop or rise position, use of an interchangeable ball assembly when the ball mount is inverted to the other position (drop or rise) necessitates removing the interchangeable ball shank from the ball mount platform and reinstalling it for use in the opposite position. With the current invention of symmetrical shanks protruding in both directions, the assembly functions the same whether the ball mount is used in either the drop or rise position; simply attach desired size interchangeable ball for a particular towing application on the select trailer ball shank and stow an interchangeable spare ball on the other trailer ball shank.

Attaching an additional interchangeable trailer ball shank to a hitch assembly (whether forged, bolted or welded) to provide for a convenient location to stow additional interchangeable ball spheres is not limited to the underside of ball mount platform 30, but may be attached to any other location on a hitch assembly such as, but not limited to, the top bottom or sides of a ball mount or other accessory shank, on a sleeve that slides on ball mount shank and positioned between ball mount platform and receiver when ball mount is engaged with receiver, on a ball mount extension, on a receiver, on the rear surface of a ball mount platform on an extended drop ball mount, on the bottom or top of a vertical shank on adjustable ball mounts, weight distribution hitches and adjustable pintles hitches, etc.

As can be recognized and appreciated by one skilled in the art, in lieu of ball mount platform extension tab 6 and/or trailer ball 40A, any conventional automotive accessory, ATV accessory, UTV accessory, snowmobile accessory, golf cart accessory, lawn and garden tractor accessory, and/or any other recreational vehicle type accessory may be attached to trailer ball shank 43 utilizing the teachings of this application. Such product applications are recognized and anticipated and considered to be within the scope of this invention. Ball mount platform extension tab 6 may, in and of itself, be used as an attachment base for engaging, housing and/or supporting the connection of other accessories. In addition, it is recognized and anticipated that elements of the embodiments of this application may be affixed to and be a component of the tow vehicles themselves, and, thus, are also considered to be within the scope of this application.

Figure 11:
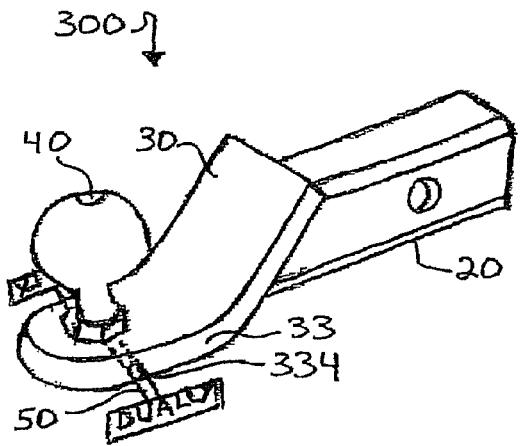
FIG. 11 is a rear side perspective view of another embodiment of the Multi-Function Anti-Rotational/Anti-Theft Hitch Ball Assembly utilizing an alternative pinning method.

Referring to FIGS. 11 and 12, there is shown another embodiment of the present invention referred to by Reference Number 300. This embodiment is similar to the embodiments of Reference Numbers 10, 100, and 200 described above but utilizes an alternate location and direction for housing and inserting locking pin(s) 50. In this embodiment, the bore in the ball mount platform 334 for housing locking pin(s) 50 does not run parallel with the ball mount platform as shown in the previous embodiments, but extends perpendicular to the ball mount platform.

In the illustrated embodiment, throughbore 334 in ball mount platform 30 extends horizontally in the center of the body section 33 of ball mount platform 30 between sides of ball mount platform into vertical throughbore 38. Alternatively, in lieu of throughbore 334 in ball mount platform 30 extending completely through the center of the body section 33 of ball mount platform 30 from one side and projecting through the other side as shown, throughbore 334 may extend horizontally in the center of the body section 33 of ball mount platform 30 between one side only of ball mount platform into vertical throughbore 38. Cooperating locking pin bore 46/246 in hitch ball 40 may extend completely through hitch ball shank 43 as previously shown in FIGS. 1-8 as throughbore 46 or may extend only partially into the hitch ball shank 43, as shown in FIGS. 9 and 10 as bore 246.

As shown in FIG. 12 and previously described, locking pin 50 may be an integral feature of an additional accessory such as the shank of an indicia plate, or may be a stand-alone locking pin shown as locking pin 50a. Locking pin 50 or 50a may be one locking pin extending from one side of ball mount platform completely through hitch ball 40 and into or through the other side of ball mount platform 30, or may be two separate locking pins as shown extending from each side of ball mount platform 30 into throughbore 46 or bores 246 of hitch ball 40. In addition, locking pin(s) 50a may be of a length to fit flush with side(s) of ball mount platform 30 when pin(s) is seated in position or may protrude (as shown) from the side(s) of ball mount platform 30 when pin(s) is seated in position. Protruded locking pin(s) 50a may be used to secure other accessories, such as a hitch ball cover (not shown), to the ball mount platform 30.

As can be appreciated by one skilled in the art, throughbores 34 and 334 need not be positioned parallel with, or perpendicular to, ball mount platform 30 as shown, but can be oriented at positions in between.

Locking pins 50 and 50a in the embodiments described above are, in and of themselves, an effective way to attach additional accessories such as indicia plates or mounts, reflectors, tail lights, brake lights, or any other hitch accessory to the ball mount. With the shank or pin of the additional accessory inserted into horizontal throughbore 34/334 on ball mount platform 30 and throughbore 46/246 of hitch ball 40, when tightening the trailer ball fastener 48, the trailer ball shank 43 will apply torque to the locking pin or shank and secure the accessory to ball mount platform 30. The embodiments shown in FIGS. 13 through 17 provide additional reinforcement in securing locking pins 50 to ball mount platform 30. To one unskilled or unfamiliar with the art, the ancillary pinning support could serve as an anti-theft feature since the locking pin 50 will not automatically dislodge itself from ball mount 30 when fastener 48 is removed, and, when locking pin 50 is the shank of an additional accessory, locking pin 50 is not visually apparent. Additionally, even if one is familiar with the art, the ancillary pinning support may serve as a theft deterrent since additional steps or procedures (such as loosening or removing set screw 680 from underneath side 32 of ball mount platform 30) are required to withdraw locking pin 50 from ball mount platform to remove hitch ball 40.

Figure 13:
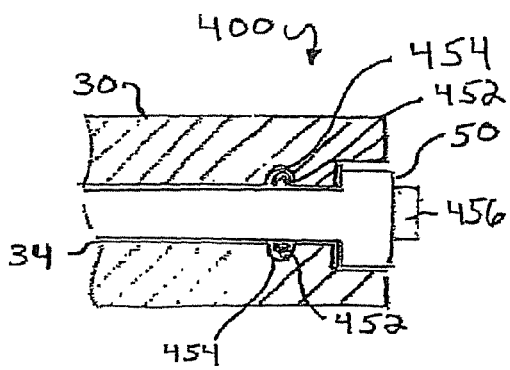
FIG. 13 is an exploded side elevation view of an alternative embodiment of the Multi-Function Anti-Rotational/Anti-Theft Hitch Ball Assembly utilizing a locking, locking pin.

Referring to FIG. 13, there is shown another embodiment of the present invention referred to by Reference Number 400. In this embodiment, locking pin 50 is a small-diameter, standard double-ball positive locking pin (as shown) or a small-diameter, standard single-ball positive locking pin (not shown). In this embodiment, although not required, a groove or recess 454 may be machined in throughbore 34 in ball mount platform or throughbore 46 in hitch ball shank 43 to align with balls 452 on positive locking pin 50 when positive locking pin 50 is inserted and seated in position on ball mount platform 30. Grove or recess 454 engages balls 452 of positive locking pin 50 when the push button 456 is released on positive locking pin 50.

Figure 14:
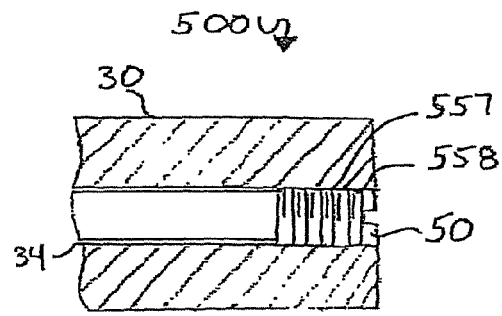
FIG. 14 is an exploded side elevation view of an alternative embodiment of the Multi-Function Anti-Rotational/Anti-Theft Hitch Ball Assembly utilizing a threaded locking pin.

Referring to FIG. 14, there is shown another embodiment of the present invention referred to by Reference Number 500. In this embodiment, one end of locking pin 50 has an external thread convolution 557 that engages internal thread convolution 558 within throughbore 34 on ball mount platform 30 as locking pin 50 is threaded into position.

Figure 15:
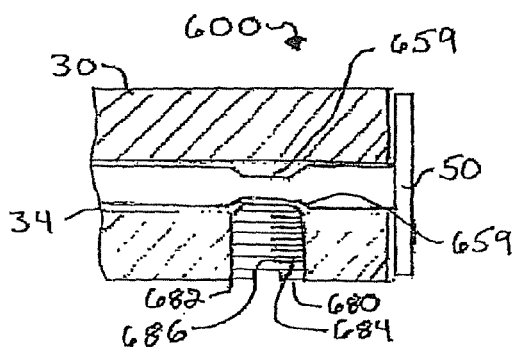
FIG. 15 is an exploded side elevation view of an alternative embodiment of the Multi-Function Anti-Rotational/Anti-Theft Hitch Ball Assembly utilizing a set screw and locking pin.

Referring to FIG. 15, there is shown another embodiment of the present invention referred to by Reference Number 600. In this embodiment, a set screw 680 is used to further secure locking pin 50 to ball mount platform 30. In addition to locking pin throughbore 34, ball mount platform 30 also has a set screw receiving throughbore 682 which abuts locking pin throughbore 34 for receiving set screw 680. Set screw 680 has an external thread convolution 684 that engages internal thread convolution 686 within set screw receiving throughbore 682. When hitch ball 40 is installed on ball mount platform 30 and locking pin 50 inserted into position and engaged with hitch ball 40, set screw 680 is tightened against locking pin 50 and helps secure locking pin 50 to ball mount platform 30. Locking pin 50 may have a flat surface or groove 659 to further secure locking pin 50 to ball mount platform 30, but the flat surface or groove is not required. The set screw 680 of this embodiment may be used in conjunction with, rather than in lieu of, other embodiments of the present invention.

Figure 16:
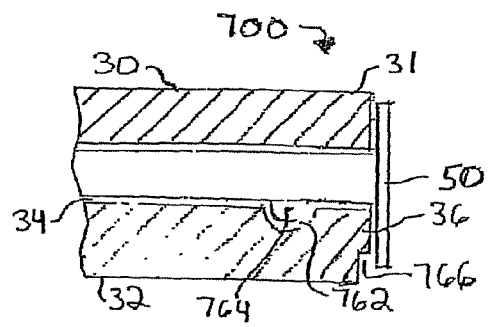
FIG. 16 is an exploded side elevation view of an alternative embodiment of the Multi-Function Anti-Rotational/Anti-Theft Hitch Ball Assembly utilizing a detent locking pin.

Referring to FIG. 16, there is shown another embodiment of the present invention referred to by Reference Number 700. In this embodiment, locking pin 50 is made as a detent pin to further secure locking pin 50 to ball mount platform 30. In this embodiment, although not required, preferably a groove or recess 762 is machined in throughbore 34 in ball mount platform or throughbore 46 in hitch ball shank 43 to align with spring biased detent ball 764 on detent locking pin 50 when detent locking pin 50 is inserted and seated in position on ball mount platform 30. When hitch ball 40 is installed on ball mount platform 30 and locking pin 50 inserted into position and engaged with hitch ball 40, the spring biased ball on detent locking pin 50 engages groove 762 and further secures detent locking pin 50 to ball mount platform 30. As shown in this embodiment and the one illustrated in FIG. 17, ball mount platform 30 may have a notch 766 in the top side 31 or bottom side 32 at the center rear face of the ball mount platform 36 for inserting a small blade screwdriver or other object to pry on the end of locking pin 50 to assist in removing locking pin 50 from ball mount 30. Notch 766 in ball mount platform 30 may be applied to any of the embodiments in this application.

Figure 17:
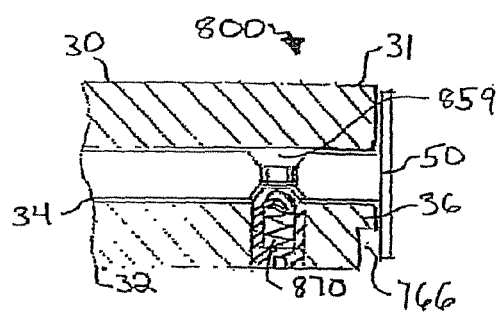
FIG. 17 is an exploded side elevation view of an alternative embodiment of the Multi-Function Anti-Rotational/Anti-Theft Hitch Ball Assembly utilizing a plunger locking pin.

Referring to FIG. 17, there is shown another embodiment of the present invention referred to by Reference Number 800. In this embodiment, ball mount platform 30 contains a spring biasing detent pin 870, which abuts locking pin throughbore 34, to further secure locking pin 50 to ball mount platform 30. In this embodiment, although not required, preferably a groove or recess 859 is machined in locking pin 50 to align with spring biased detent pin 870 in ball mount platform 30 when locking pin 50 is inserted in throughbore 34 and seated in position on ball mount platform 30. When hitch ball 40 is installed on ball mount platform 30 and locking pin 50 inserted into position and engaged with hitch ball 40, the spring biased detent pin 870 in ball mount platform 30 engages groove 859 and further secures locking pin 50 to ball mount platform 30.

Figure 18:
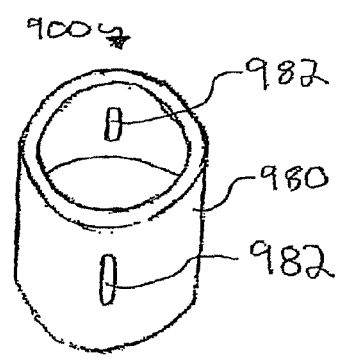
FIG. 18 is an exploded perspective view of an embodiment utilizing a bushing that may be used in conjunction with the Multi-Function Anti-Rotational/Anti-Theft Hitch Ball Assembly.

Referring to FIG. 18, there is shown another embodiment of the present invention referred to by Reference Number 900. In the current art, it is a common practice to utilize a bushing 980 that is inserted in vertical throughbore 38 of ball mount 30 to facilitate the use of a hitch ball comprising a shank 43 that is smaller in diameter than the diameter of vertical throughbore 38 in the ball mount platform. To facilitate the practice of the invention in this scenario, the anti-rotational/anti-theft hitch ball assembly embodies the hitch ball/ball mount bushing 980 illustrated in FIG. 18. Hitch ball/ball mount bushing 980 is a standard hitch ball/ball mount bushing modified to include apertures 982 through opposing sides of bushing. To optimize locking pin alignment, apertures 982 in hitch ball/ball mount bushing 980 may have a vertical slot-type configuration as shown. In addition, apertures 982 may be circular in shape or any other shape to conform to the shape of locking pin 50, ball mount throughbore 34 and hitch ball throughbore 46.

Figure 19B:
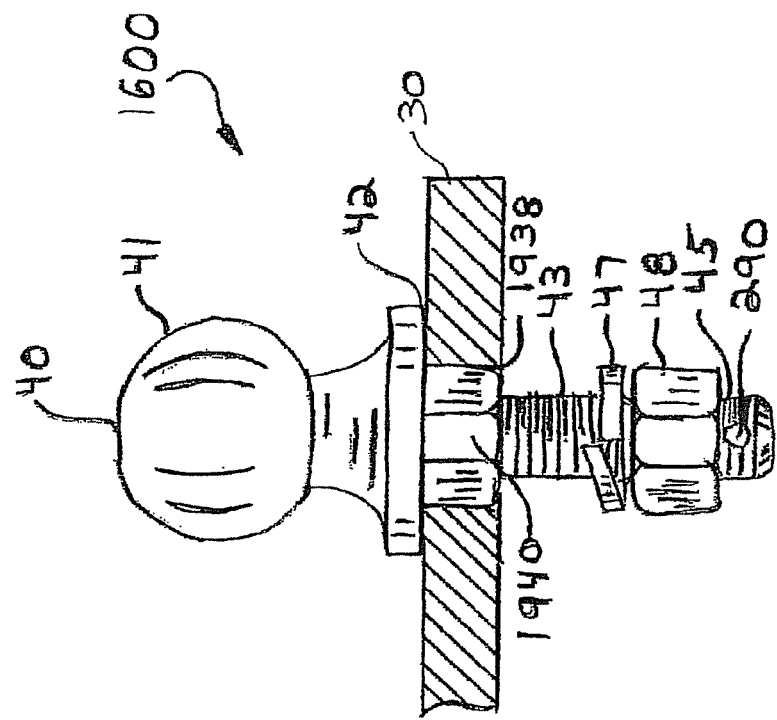
FIG. 19B is of a side elevation view of the hitch ball and ball mount platform of FIG. 19A.
Figure 19A:
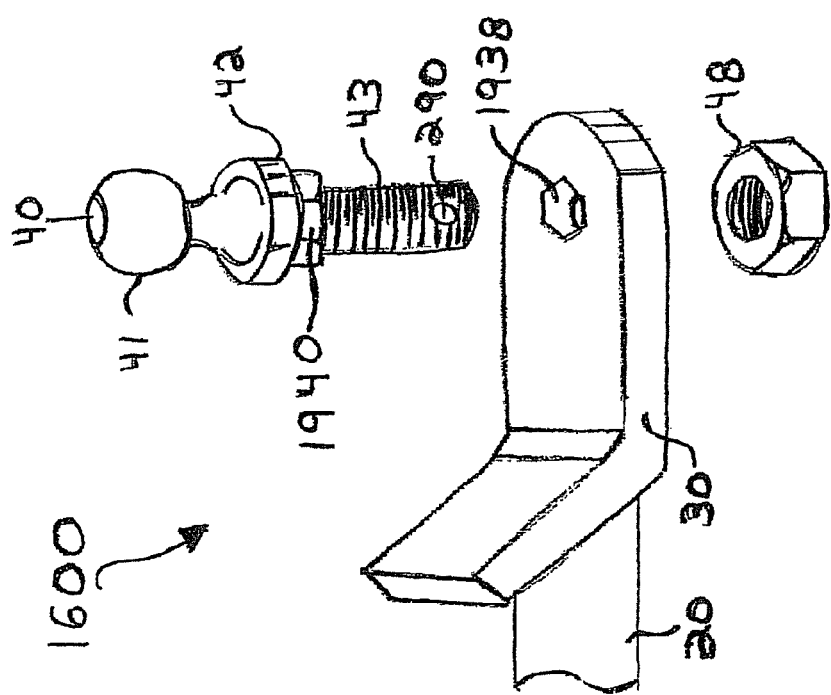
FIG. 19A is an exploded perspective view of another embodiment of the Multi-Function Anti-Rotational/Anti-Theft Hitch Ball Assembly that utilizes an alternate method of interlocking the hitch ball and ball mount platform.

Referring to FIGS. 19A and 19B, there are shown an exploded perspective view and side elevation view of another embodiment of the present invention referred to by Reference Number 1600. In this embodiment, aperture 1938 in ball mount platform 30 is hexagonal shaped, rather than the industry-standard circular-shaped. Hexagonal shaped aperture 1938 still permits a conventional hitch ball with cylindrical shaped shank 43 to be utilized in ball mount assembly with no reduction in performance. However, when used in conjunction with inventive hitch ball 40 of FIGS. 19A and B, hexagonal shaped aperture 1938 results in an anti-rotational hitch ball assembly. Hitch ball 40 comprises a standard flange 42 and ball sphere 41. However, the upper portion of threaded shank 42 that abuts the lower portion of flange 42 is hexagonal shaped to engage and interlock with hexagonal shaped throughbore 1938 in ball mount platform 30 resulting in an anti-rotational interlocking hitch ball assembly.

Figure 20:
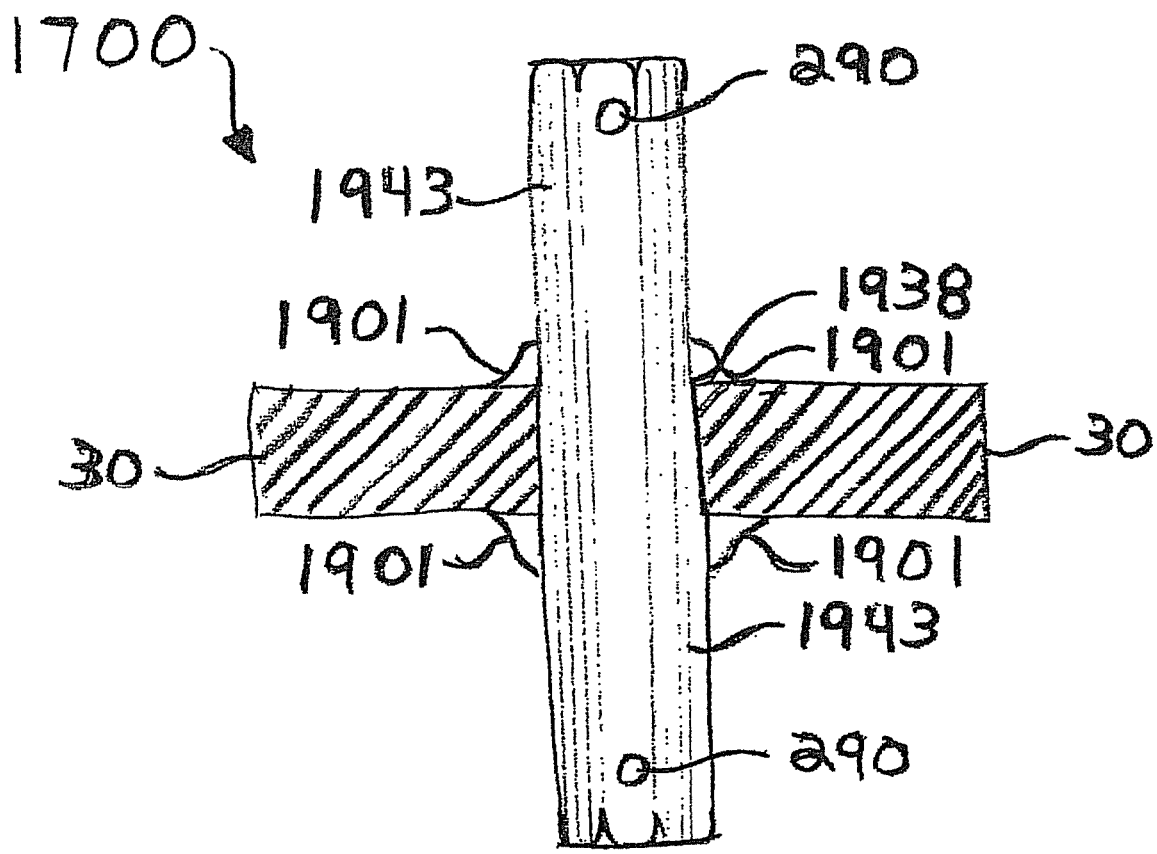
FIG. 20 is an exploded side elevation view of another embodiment of the Multi-Function Anti-Rotational/Anti-Theft Hitch Ball Assembly that utilizes the throughbore in ball mount platform of the embodiment of FIGS. 19A and 19B to engage a mating accessory shank.

Referring to FIG. 20, there is shown an exploded side elevation view of another embodiment of the present invention referred to by Reference Number 1700. This embodiment utilizes the hexagonal-shaped throughbore in ball mount platform of the embodiment of FIGS. 19A and 19B to engage a mating accessory shank 1943. Accessory shank 1943 is also hexagonal shaped and may extend upward from the mounting platform, downward from the mounting platform or extend in both the upper and downward directions from mounting platform 30. Unlike a conventional hitch ball, accessory shank 1943 has no flanges to mount to the surface of platform 30, but is positioned on mounting platform 30 within hexagonal shaped aperture 1938 and attached to platform such as by welding in areas 1901. Accessory shank 1943 may be solid or hollow shank and may contain an internal threaded convolution if the shank is hollow. Accessory shank 1943 may also contain throughbores 290 useful for pinning accessories to shank 1943. Shank 1943 may accommodate the attachment of ball spheres, other accessories, or a combination of both to shank 1943.

The embodiments illustrated in FIGS. 13 through 20 above may employ locking pin lock 60 as shown in FIGS. 1 through 8, and locking methods, including the use of locking plate 155, as described in the previous embodiments.

As can be appreciated by one skilled in the art, the indicia plate of locking pin 50 may contain the logos, symbols, acronyms, names, expressions, lettering, etc. of social, political, fraternal, professional or religious organizations, manufacturers, retailers, government, corporate, partnership, non-profit or sole-proprietorship business entities, professional and nonprofessional athletic teams, colleges, universities and other educational institutions, geographical locations, or any other indicia including individualized, customized indicia as desired by consumers. Such indicia are anticipated, and, thus, considered to be within the scope of this application.

It should be apparent to those skilled in the art that the practice of the present invention not only applies to the type of hitch balls and ball mounts illustrated, but also applies to the shank of any other type hitch ball such as an interchangeable hitch ball and any mount to which the hitch ball is fastened, including, but not limited to, drawbars, weight distribution hitches, adjustable ball mounts, zero-tilt ball mounts, specialty ball mounts, folding ball mounts, turn over ball mounts, roller ball mounts and combination ball and pintles.

In addition, the invention also applies to any product that is secured to a ball mount platform via the vertical throughbore in ball mount platform used for attaching the hitch ball.

It is to be understood that the present invention is not limited to the embodiments described above but encompasses any and all embodiments within the scope of the following claims.

The invention claimed is:

1. A hitch ball assembly, comprising:
   a ball mount platform having a front end, a rear end, a flat top, a ball mount throughbore, and opposed sides;
   a removable rigid retaining bracket configured to engage the ball mount platform, wherein the retaining bracket comprises:
   a body having a planar top surface and a planar bottom surface, a front end, and a rear end, with the ends being closed ends;
   a blind bore cavity formed in the body top surface and having an upper blind bore diameter different from and larger than a lower throughbore diameter, with the upper blind bore cavity having a non-circular shape configured to conform to at least a portion of a shape of a side edge of a hitch ball flange; and
   a pair of opposed, downwardly depending rigid sides configured to engage the sides of the ball mount platform, wherein the sides define a substantially rectangular channel having an open front end, an open rear end, and an open bottom; and
   a hitch ball having a ball portion with a hitch ball flange and a shank and configured to engage the blind bore cavity of the bracket and the ball mount platform throughbore such that the hitch ball flange engages and remains stationary within the rigid upper blind bore cavity of the bracket and the hitch ball shank extends through the lower throughbore of the bracket and the ball mount throughbore such that the retaining bracket remains attached to the ball mount platform when the hitch ball is fastened to the ball mount platform, and wherein the rear end of the retaining bracket body is forward of the rear end of the ball mount platform when the retaining bracket and hitch ball are attached to the ball mount platform.

2. The assembly of claim 1, wherein the retaining bracket is metallic.

3. A removable rigid retaining bracket configured to attach a hitch ball to a ball mount platform, comprising:
   a body having a planar top surface, a planar bottom surface, a front end, and a rear end, with the ends being closed ends;
   a blind bore cavity formed in the body top surface and having an upper blind bore diameter different from and larger than a lower throughbore diameter, with the upper blind bore cavity having a non-circular shape configured to conform to at least a portion of a shape of a side edge of a hitch ball flange; and
   a pair of opposed, downwardly depending rigid sides configured to engage the sides of a ball mount platform, wherein the sides define a substantially rectangular channel having an open front end, an open rear end, and an open bottom, and wherein the rear end of the retaining bracket body is forward of the rear end of the ball mount platform when the retaining bracket and hitch ball are attached to the ball mount platform.

4. The assembly of claim 3, wherein the retaining bracket is metallic.

5. A method of interlocking a hitch ball to a ball mount platform, comprising the steps of:
   placing a rigid retaining bracket onto a ball mount platform having a front end and a rear end, the retaining bracket comprising opposed sides, a body having a planar top surface, a planar bottom surface, a front end and a rear end with the ends being closed ends, a blind bore cavity formed in the body top surface and having an upper blind bore diameter different from and larger than a lower throughbore diameter, and with the upper blind bore cavity having a non-circular shape configured to conform to at least a portion of a shape of a side edge of a hitch ball flange, and a pair of opposed, downwardly depending sides, wherein the sides define a substantially rectangular channel having an open front end, an open rear end, and an open bottom;
   placing the rigid retaining bracket on the ball mount platform such that the lower throughbore aligns with a ball mount throughbore of the ball mount platform, the opposed sides of the retaining bracket mate with the sides of the ball mount platform, and the rear end of the retaining bracket body is forward of the rear end of the ball mount platform;
   placing a shank of a hitch ball through the blind bore cavity and the platform throughbore such that the hitch ball flange engages the upper blind bore and the shank extends through the lower throughbore and the platform throughbore;
   attaching a fastener to the ball mount shank such that the torque supplied to the shank is transferred to the platform via the rigid retaining bracket; and
   maintaining the bracket in place on the ball mount platform until the hitch ball is removed from the ball mount platform.

6. The assembly of claim 5, wherein the retaining bracket is metallic.

* * * * *

UNITED STATES PATENT AND TRADEMARK OFFICE
CERTIFICATE OF CORRECTION

| | | |
|---|---|---|
| PATENT NO. | : 8,376,387 B2 | Page 1 of 1 |
| APPLICATION NO. | : 12/211924 | |
| DATED | : February 19, 2013 | |
| INVENTOR(S) | : John R. Columbia | |

It is certified that error appears in the above-identified patent and that said Letters Patent is hereby corrected as shown below:

ON THE TITLE PAGE:

Column 1, Item (63) Related U.S. Application Data, delete "Jun. 4, 2008." and insert -- Jun. 4, 2008, now abandoned. --

IN THE SPECIFICATIONS:

Column 1, Line 9, delete "Jun. 4, 2008," and insert -- Jun. 4, 2008, now abandoned --

Signed and Sealed this
Third Day of September, 2013

Teresa Stanek Rea
*Acting Director of the United States Patent and Trademark Office*